US011510761B2

(12) United States Patent
Nuytens

(10) Patent No.: US 11,510,761 B2
(45) Date of Patent: Nov. 29, 2022

(54) SCAN POST, BITE PILLAR, REFERENCE PILLAR AND RELATED METHODS FOR RECORDING DENTAL IMPLANT POSITION

(71) Applicant: Philippe Nuytens, Kortrijk (BE)

(72) Inventor: Philippe Nuytens, Kortrijk (BE)

(73) Assignee: Philippe Nuytens, Kortrijk (BE)

( * ) Notice: Subject to any disclaimer, the term of this patent is extended or adjusted under 35 U.S.C. 154(b) by 713 days.

(21) Appl. No.: 16/339,394

(22) PCT Filed: Oct. 3, 2017

(86) PCT No.: PCT/IL2017/051127
§ 371 (c)(1),
(2) Date: Apr. 4, 2019

(87) PCT Pub. No.: WO2018/065984
PCT Pub. Date: Apr. 12, 2018

(65) Prior Publication Data
US 2019/0223990 A1    Jul. 25, 2019

(30) Foreign Application Priority Data
Oct. 5, 2016    (IL) .......................................... 248179

(51) Int. Cl.
*A61C 9/00*    (2006.01)
*A61C 8/00*    (2006.01)
*A61C 19/05*   (2006.01)

(52) U.S. Cl.
CPC .......... *A61C 9/0053* (2013.01); *A61C 8/0001* (2013.01); *A61C 19/05* (2013.01)

(58) Field of Classification Search
CPC ..... A61C 9/0053; A61C 9/0046; A61C 9/004; A61C 9/00; A61C 8/0001; A61C 19/05;
(Continued)

(56) References Cited

U.S. PATENT DOCUMENTS 9,492,256 B1 * 11/2016 Alotaibi ................... A61C 8/00
2007/0190481 A1 * 8/2007 Schmitt .................. A61C 19/04
433/68
(Continued)

FOREIGN PATENT DOCUMENTS

CA    2794993 A1 * 10/2011 ......... A61C 13/0004
EP    2700377      2/2014
(Continued)

OTHER PUBLICATIONS

Office Action dated Mar. 31, 2020 From the Israel Patent Office Re. Application No. 248179 and Its Translation Into English. (7 Pages).
(Continued)

*Primary Examiner* — Ralph A Lewis
*Assistant Examiner* — Mirayda A Aponte
(74) *Attorney, Agent, or Firm* — Christensen O'Connor Johnson Kindness PLLC

(57) ABSTRACT

A bite registration device including a scan post configured to attach to a dental implant, a bite pillar configured to be attached at a coronal end of the scan post, and a mechanism for attaching the bite pillar to the scan post, wherein the mechanism enables adjustment of a distance from a coronal end of the bite pillar to an apical end of the scan post. A bite pillar including a wide coronal end and an elongate shape configured to attach to an object in a mouth of a patient. A scan post including a screw thread for attaching a bite pillar thereto. A reference pillar configured as an elongate shape to be attached at a first end to an object in a mouth of a patient. Related apparatus and methods are also described.

10 Claims, 31 Drawing Sheets

(58) Field of Classification Search
CPC ....... A61C 19/04; A61C 19/44; A61C 19/045;
A61C 19/052; C06F 30/10
USPC .......... 433/74, 75, 214; 703/1; 700/118, 98,
700/97; 264/17–18
See application file for complete search history.

(56) References Cited

U.S. PATENT DOCUMENTS

2012/0052463 A1    3/2012  Pollet
2013/0203009 A1    8/2013  Mutsafi et al.
2015/0019176 A1*  1/2015  Presswood ............. A61C 9/004
703/1

FOREIGN PATENT DOCUMENTS

| WO | WO 99/04723 | 2/1999 |
| WO | WO 2016/151580 | 9/2016 |
| WO | WO 2018/065984 | 4/2018 |

OTHER PUBLICATIONS

International Preliminary Report on Patentability dated Apr. 18, 2019 From the International Bureau of WIPO Re. Application No. PCT/IL2017/051127. (9 Pages).
International Search Report and the Written Opinion dated Jan. 3, 2018 From the International Searching Authority Re. Application No. PCT/IL2017/051127. (16 Pages).

* cited by examiner

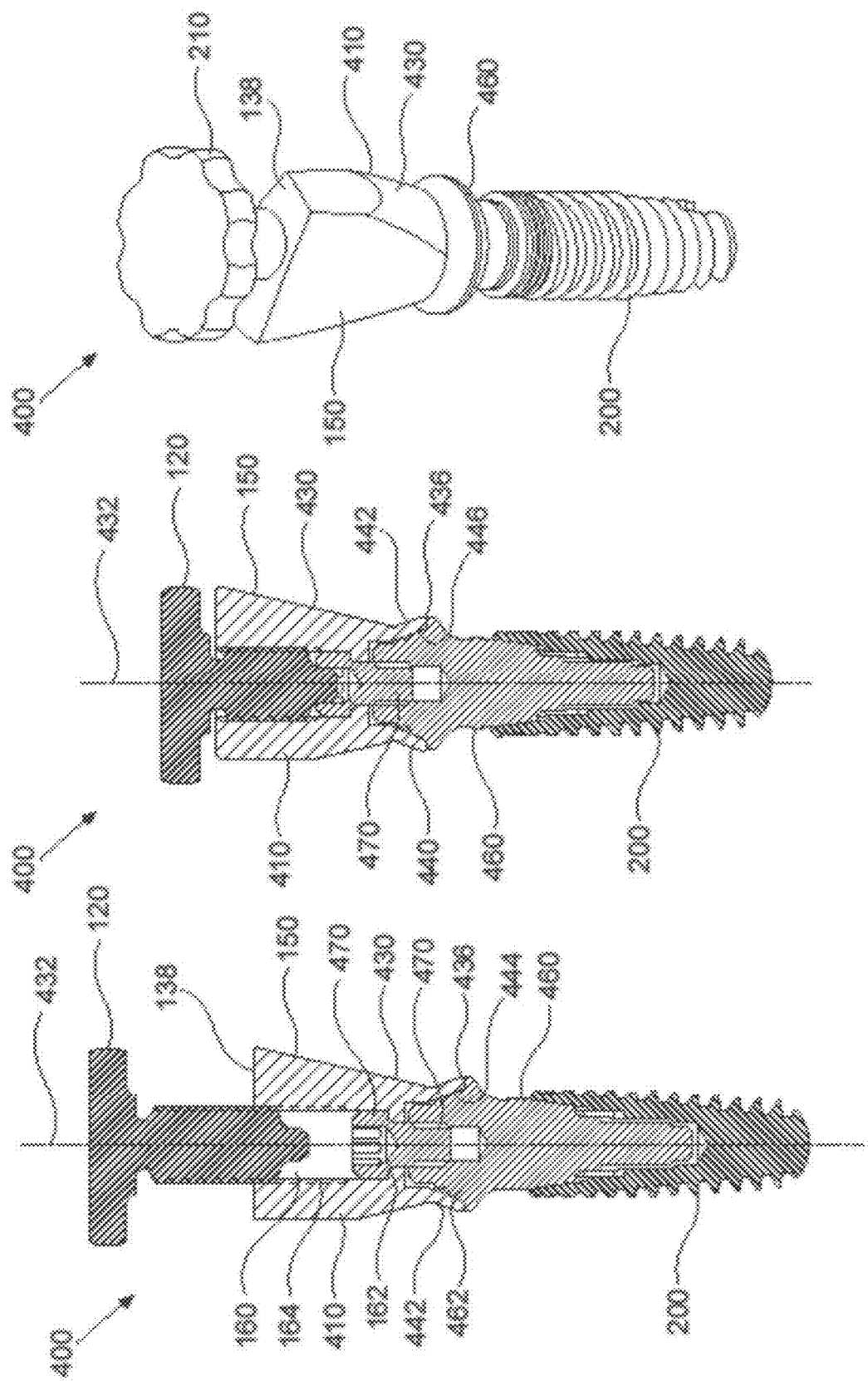

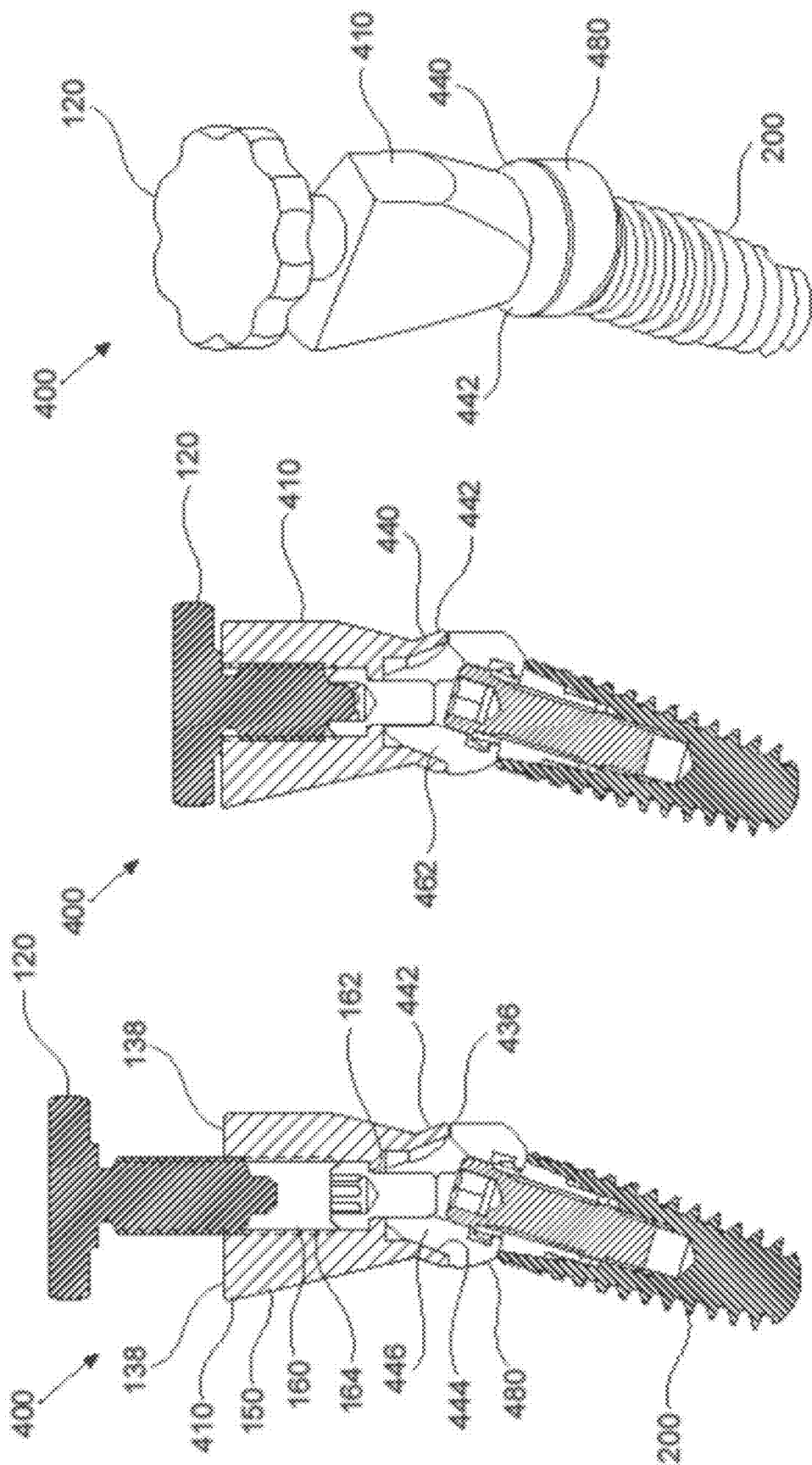

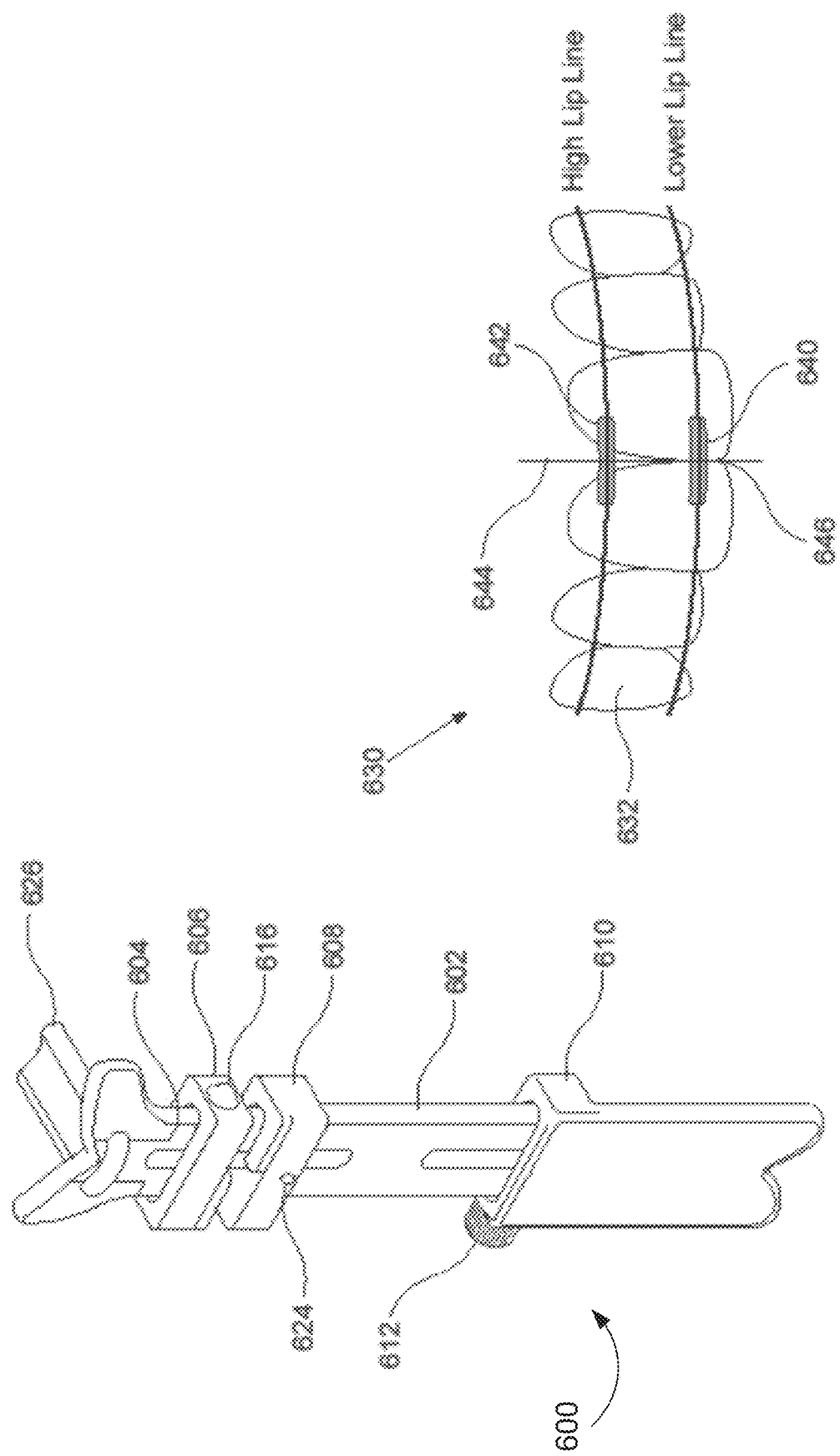

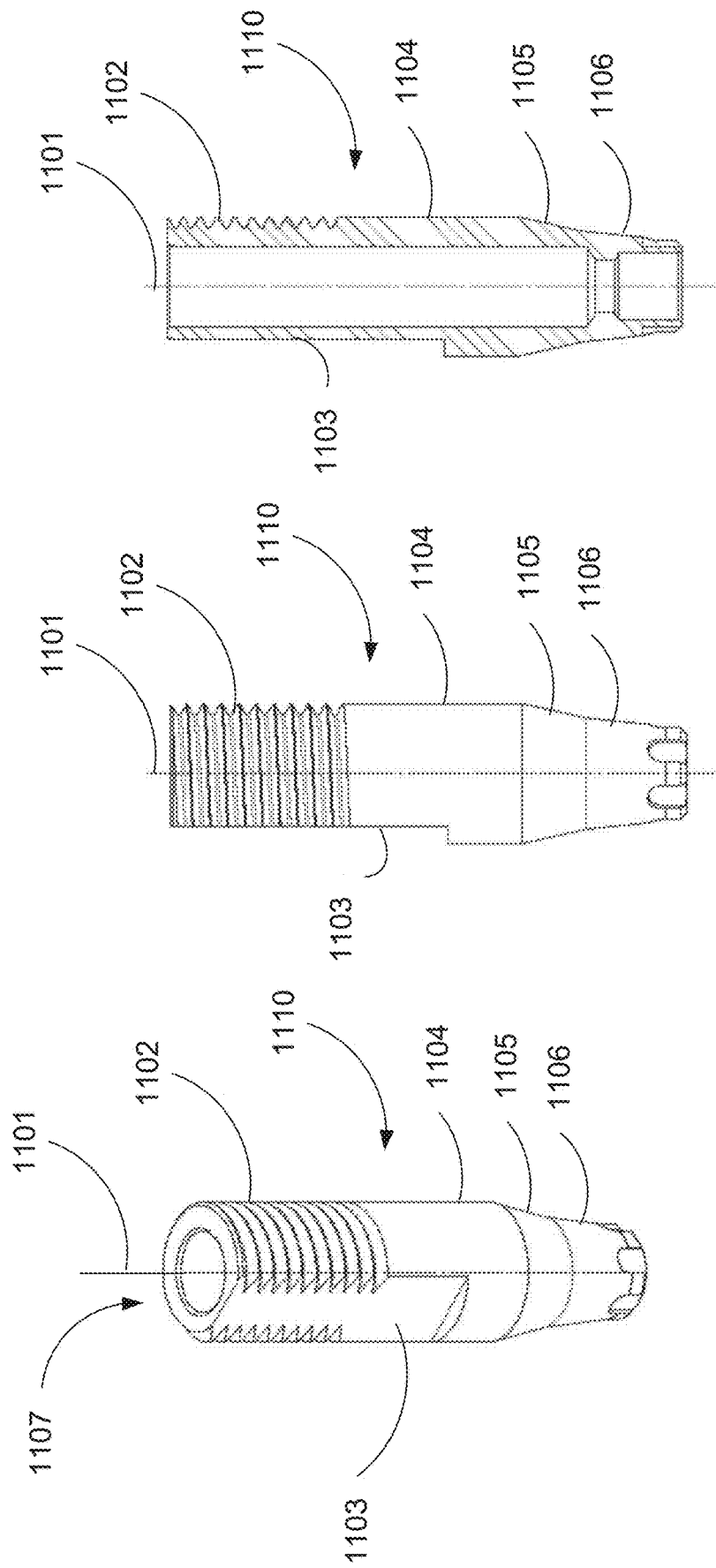

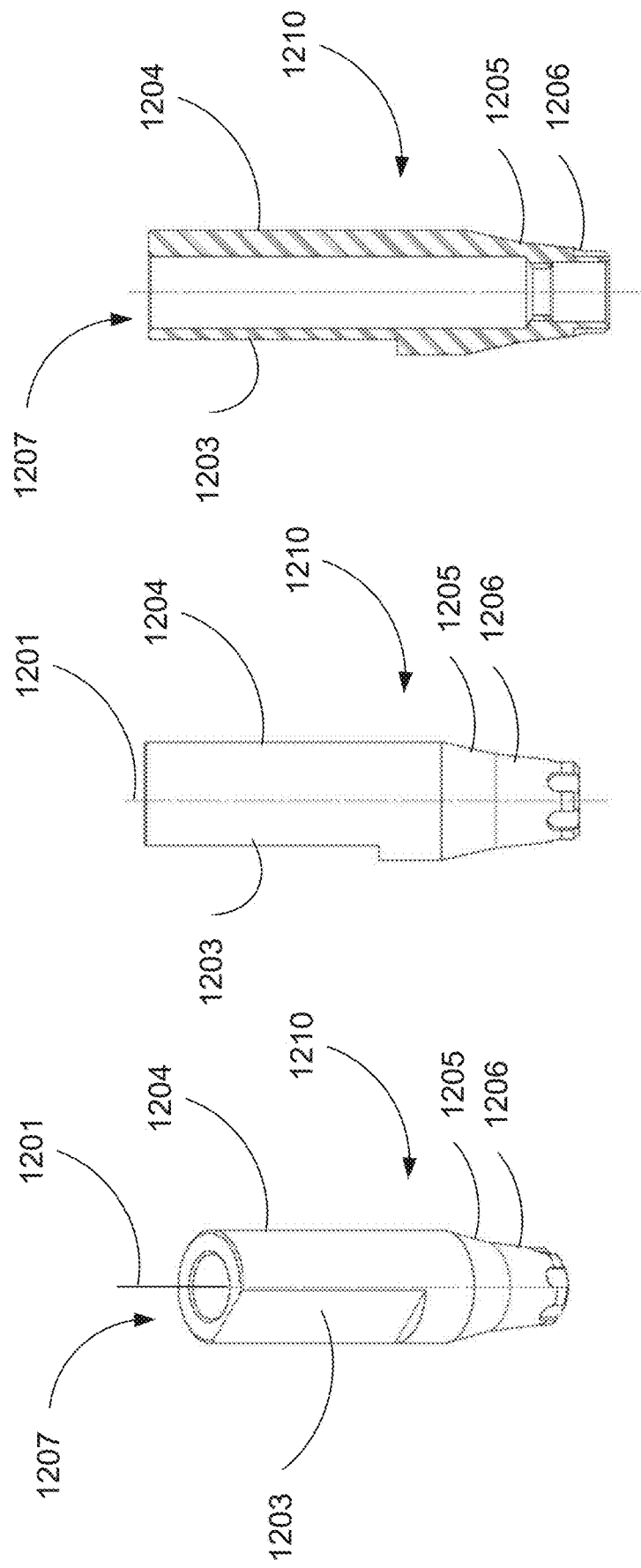

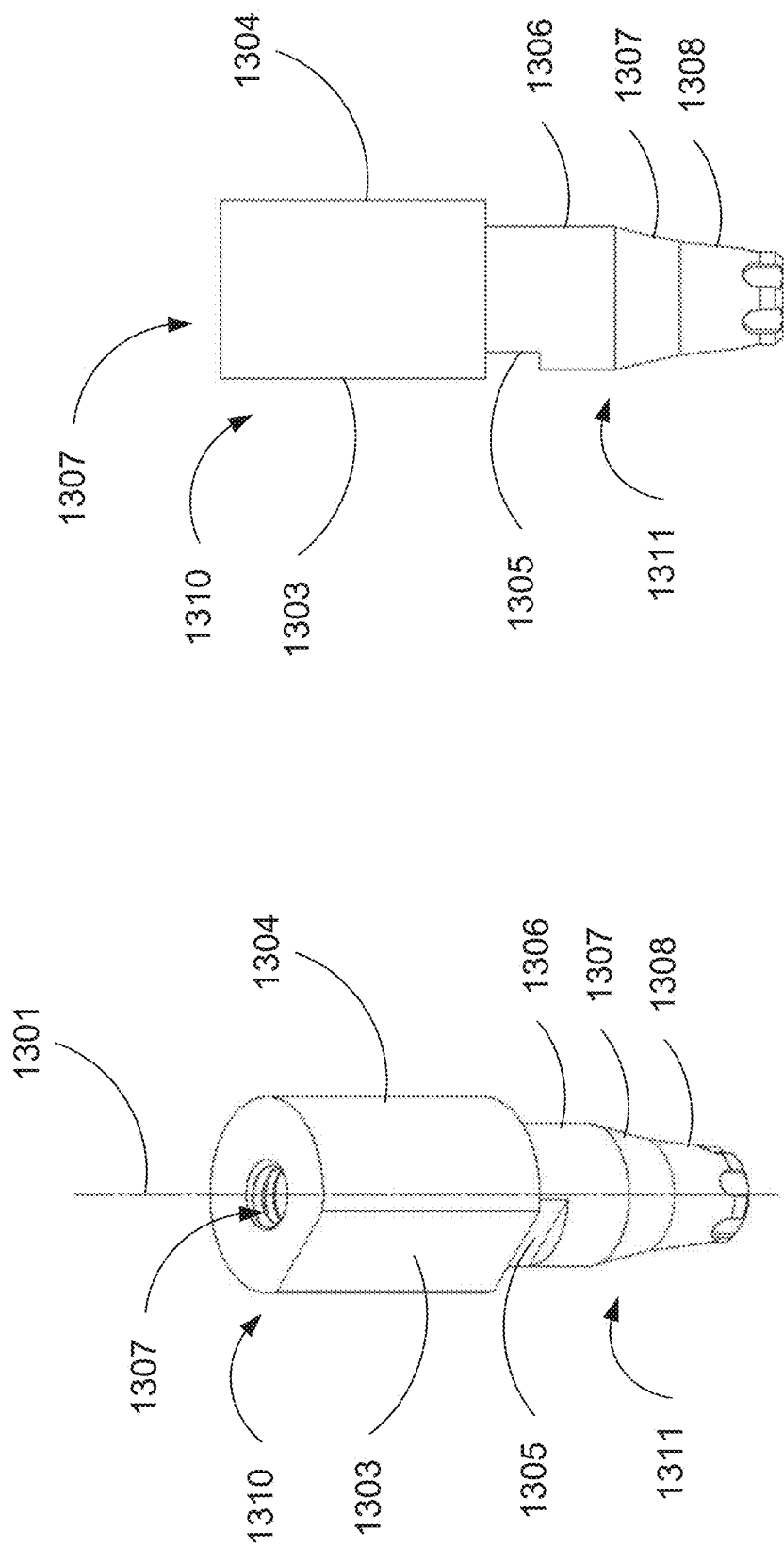

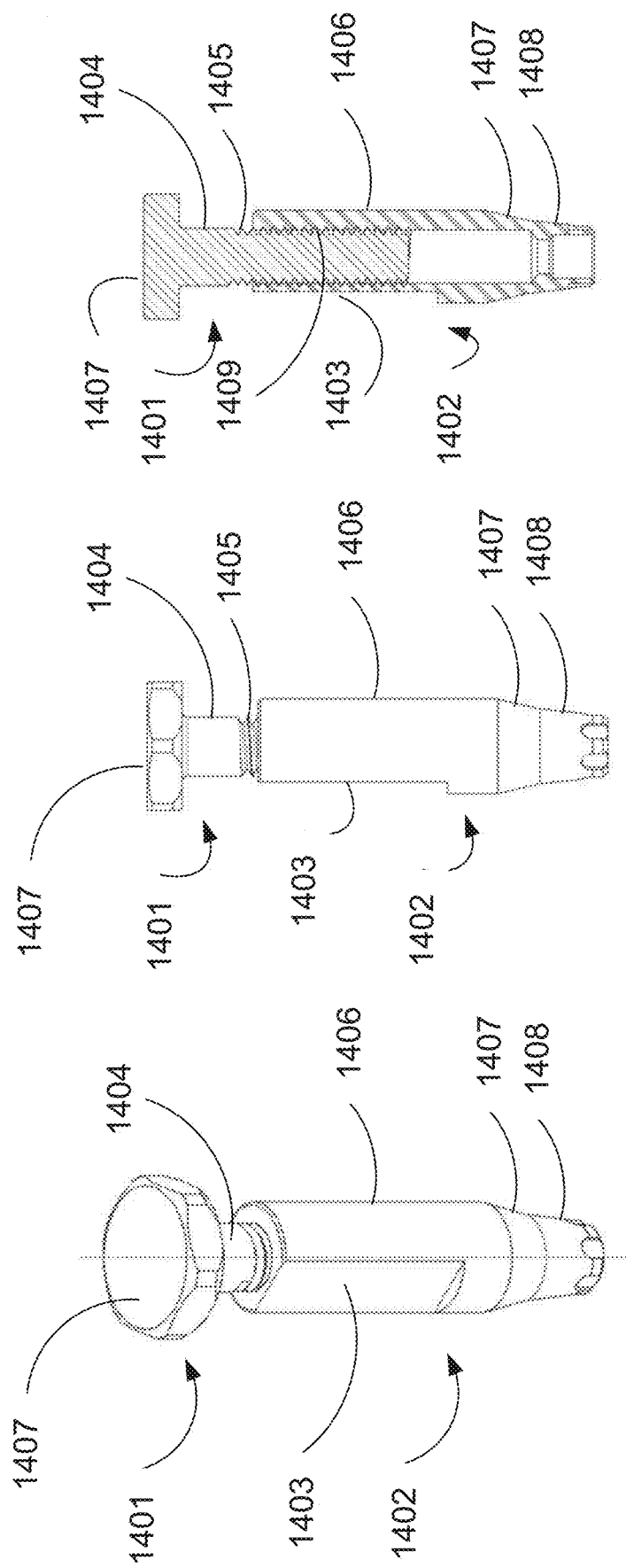

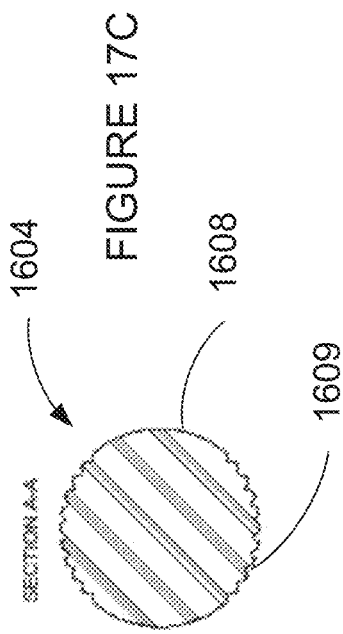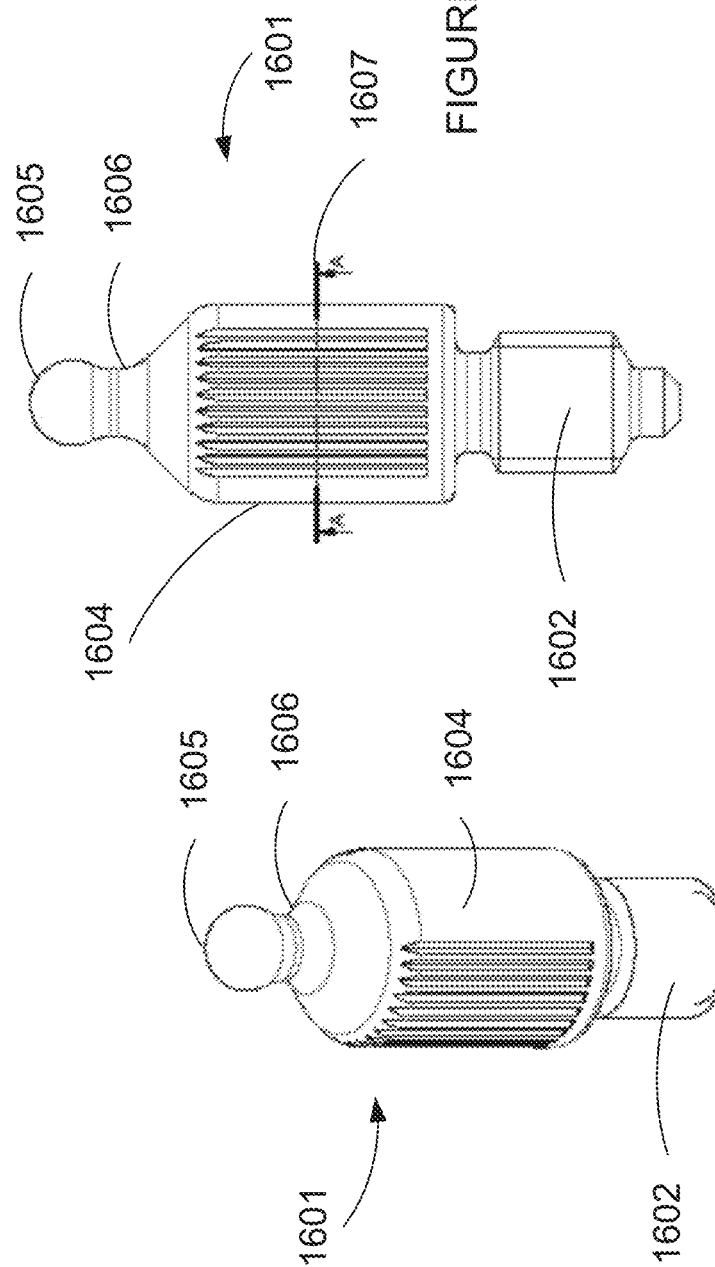

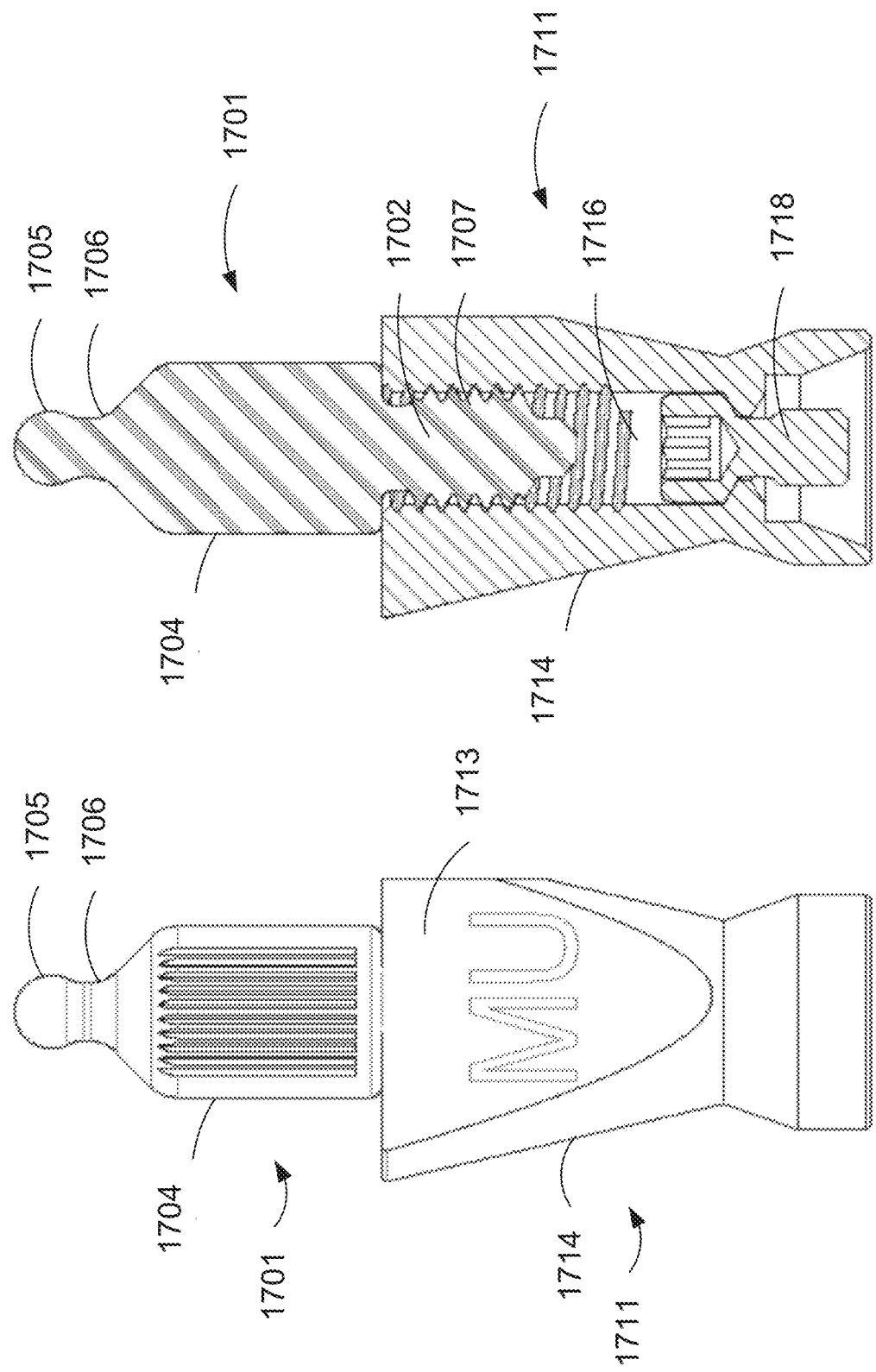

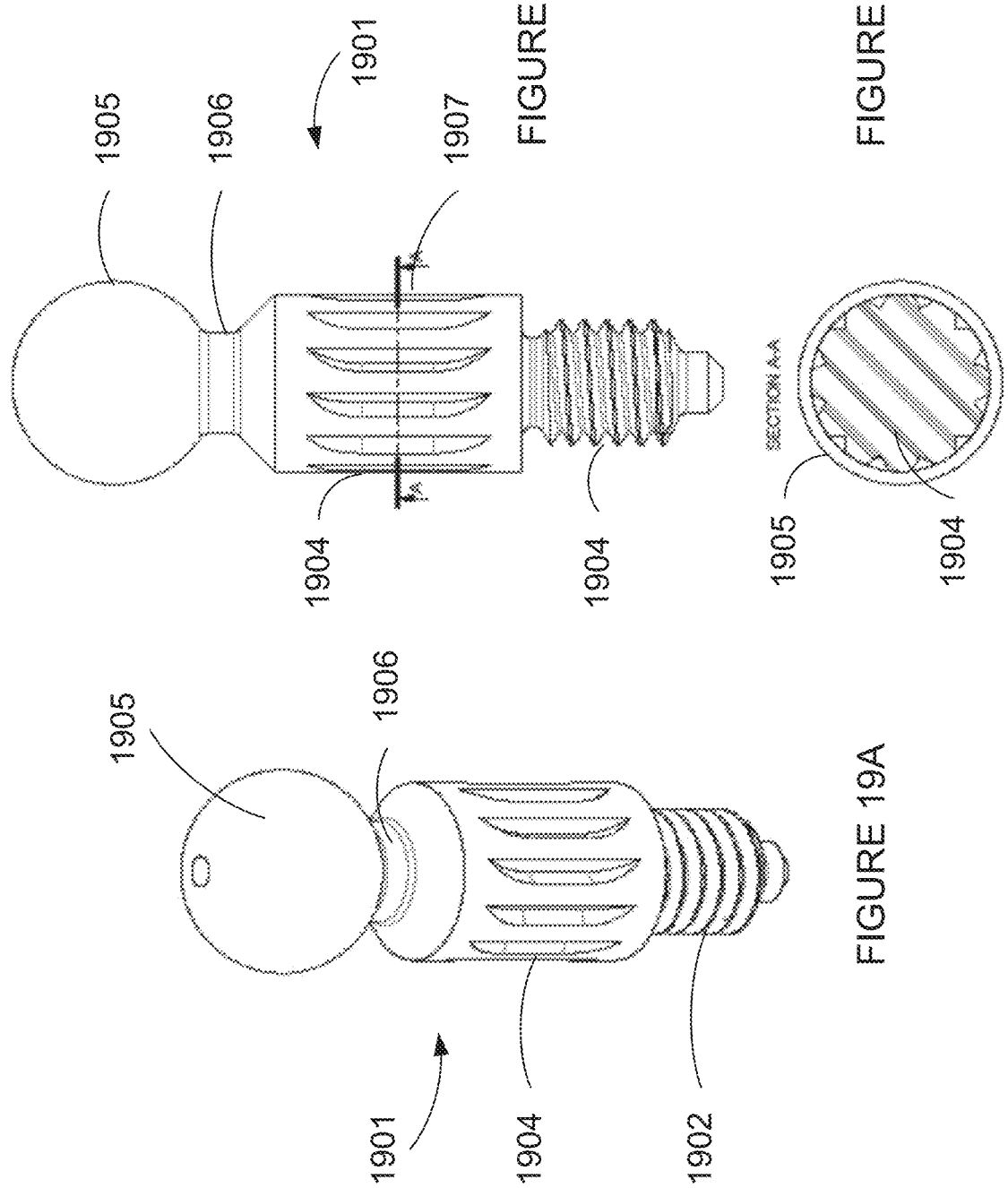

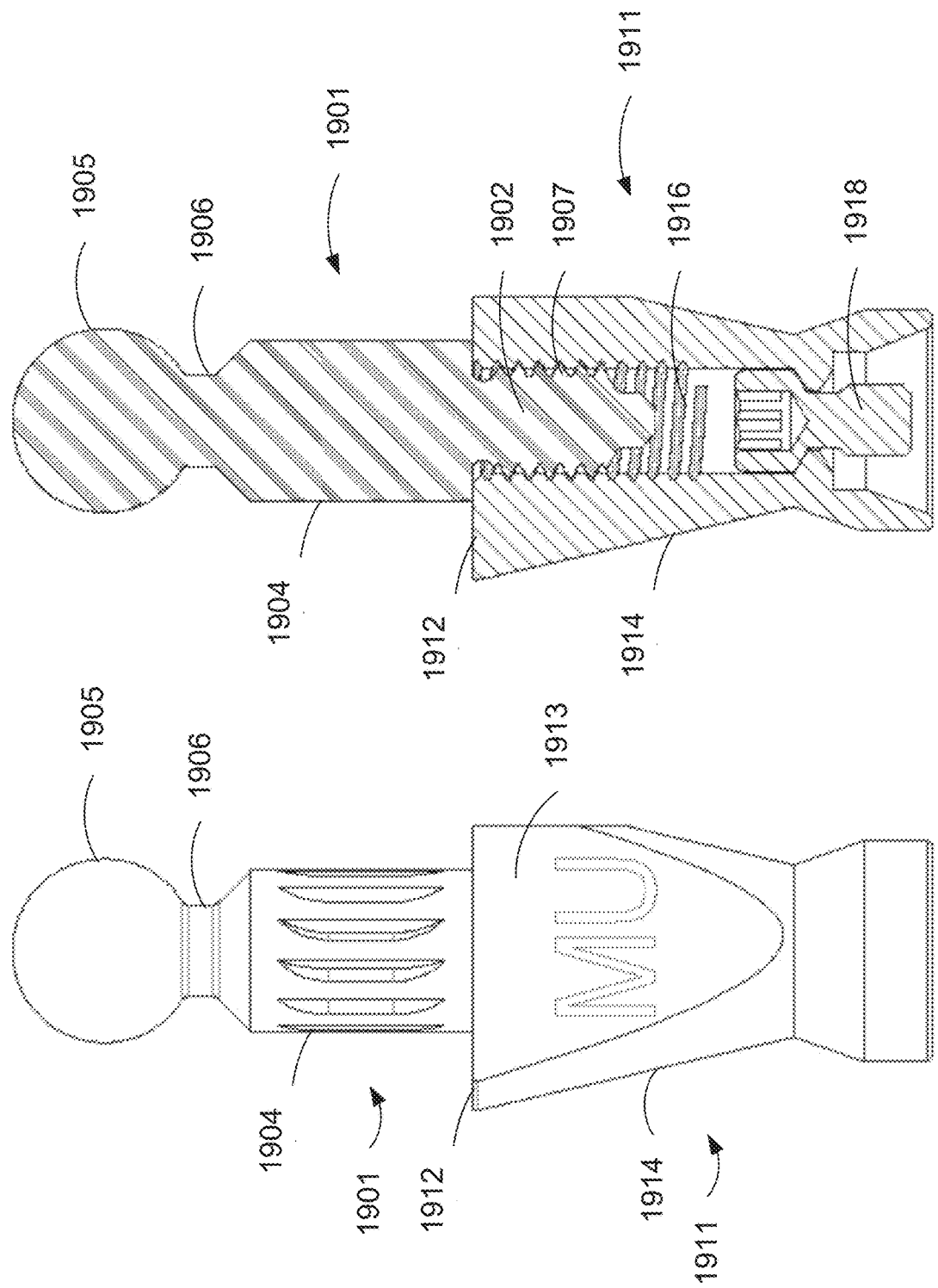

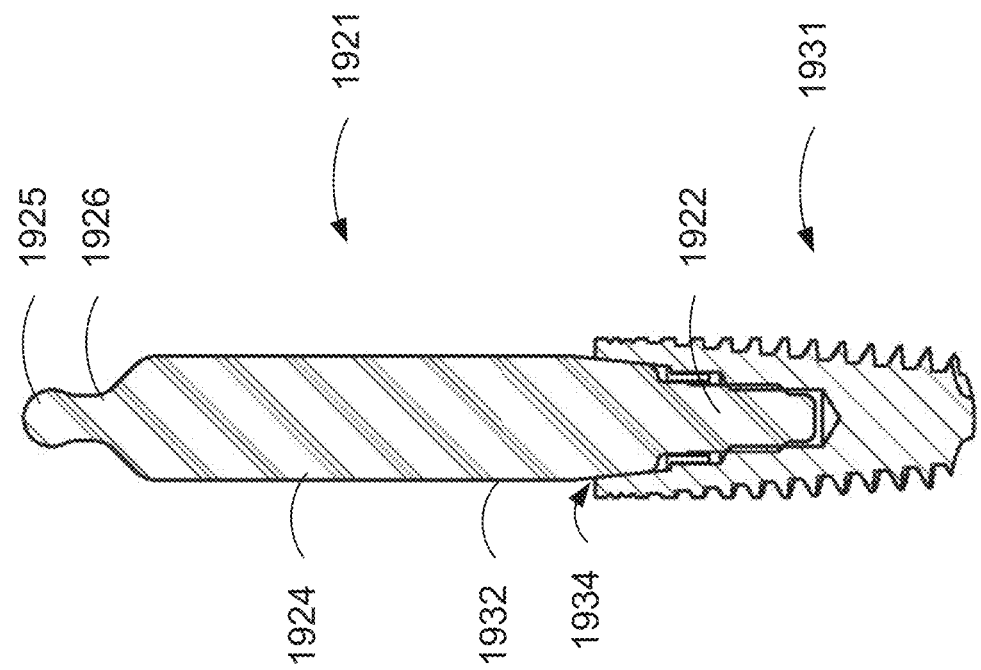
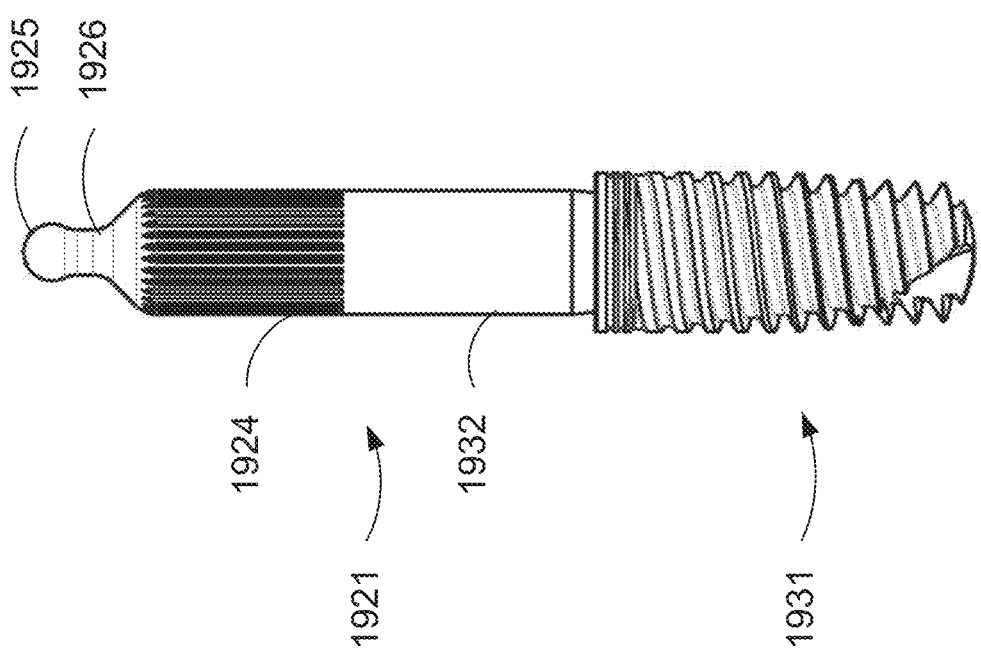

SCAN POST, BITE PILLAR, REFERENCE PILLAR AND RELATED METHODS FOR RECORDING DENTAL IMPLANT POSITION

RELATED APPLICATIONS

This application is a National Phase of PCT Patent Application No. PCT/IL2017/051127 having International filing date of Oct. 3, 2017, which claims the benefit of priority of Israel Patent Application No. 248179, filed on Oct. 5, 2016.

The contents of the above applications are all incorporated by reference as if fully set forth herein in their entirety.

FIELD AND BACKGROUND OF THE INVENTION

The invention, in some embodiments, relates to the field of dental implants and more particularly, but not exclusively, to recording methods of dental implant positions, bite registration, smile simulation and esthetic parameters.

Typical steps of currently-known techniques for registering an implant position in a patient's mouth may include the following: an implant scan body or scan post fixed on the implant by screwing or clicking, is scanned with an intra-oral scanner or an extra-oral scanner in the clinic or in the dental lab. A computer file obtained from the scanner may be used to transfer the implant information (position relative to other objects of the mouth), directly to the dental laboratory. A dental technician is then able to manufacture a 3D-model, add a replica of the implant in the exact position in the 3D model and make an implant-crown (or other implant structures) on this model. Additionally or alternatively, the dental lab is also able to manufacture a monolithic implant-crown or an implant-bridge based on the information of the computer file received from the intra-oral scanner, without making a physical 3D-model (a full virtual strategy).

The position of the implant (indicated by the position of the scan post) is preferably measured relative to nearby teeth. However, when there are no teeth in the surroundings of the implant, the scan results might not include sufficient information for properly designing the crown position and orientation. In such cases a much longer and more complex procedure is typically needed to obtain the missing information.

When there are almost no teeth, for example, or none at all, on the same jaw of the implant, or on the opposite jaw, a bite registration is impossible prior to physically building a bite-registration structure. In such cases, in a first visit of the patient to the dental clinic, an intra-oral scan of the implant jaw positions and the opposite jaw is performed. The intra oral scan information is used to print the 3D models by a dental technician who is able to make a structure on these 3D models to perform a bite registration during a second visit. In most cases the dental technician uses this bite registration structure with wax on top to allow the dentist to mold and shape the form of the teeth in this wax material. The dental laboratory will usually make a screw-retained implant-structure with a wax-rim. With the wax on the structure the patient is able to bite an incuspidation in centric relation position. When this second visit is done (the bite registration on the waxed structure), the 3D models are set up in an analog articulator using the wax structure consolidating the upper and the lower model.

Sometimes the structure with the wax rim is used to perform a digital bite registration on implants, but this is a complicated method and this is very time consuming.

In the dental laboratory, the wax structure is used to make a tooth setup. In a third visit to the clinic the tooth setup is placed on the implants. In the 4th visit, the dentist is able to try the supra structure (zirconium, chrome-cobalt or titanium superstructure). If the fit of the supra structure is correct, a bridge can be finalized in the dental lab and placed on the 5th (and final) visit.

The disclosures of all references mentioned above and throughout the present specification, as well as the disclosures of all references mentioned in those references, are hereby incorporated herein by reference.

SUMMARY OF THE INVENTION

Aspects of the invention, in some embodiments thereof, relate to dental implants. More specifically, aspects of the invention, in some embodiments thereof, relate to scan posts and related methods for registration and recording of dental implants positions.

As discussed above, current procedures for registration of an implant's position and orientation in the mouth do not always enable a completely digital workflow involving a computerized scan of the patient's mouth and a computer-assisted design of the end structure (e.g. a bridge) using a virtual model. Particularly, when there are not enough teeth in the mouth to be used as "reference locations" or to allow equitable bite registration, current procedures require manufacturing of an analog model and a cumbersome and lengthy process involving several visits of the patient to the clinic.

There is thus provided according to an example embodiment of the invention a bite registration device for planning or producing oral or maxillofacial restorative products. The bite registration device comprises a scan post made of metal or a polymer material and configured to connect to a dental implant, and a bite pillar. The scan post comprises a body extending along a longitudinal axis between an apical end and a coronal end. The body has a connection interface portion near the apical end for connecting to a dental implant. Near the coronal end thereof the body has a conical portion, pointing towards the connection interface portion, the conical portion being sectioned along preferred plains. The body further has a hole extending along the longitudinal axis from the coronal end along at least a portion of the scan post's length.

According to some embodiments the hole is a through hole through the entire length of the scan post.

The bite pillar extends between a pillar apical end and a pillar coronal end. The bite pillar comprises an apical portion proximal the apical end thereof, the apical portion being dimensioned and configured to be tunably inserted into the hole of the scan post. By tunable insertion it is meant that the bite pillar in the apical portion thereof may fit to enter the hole through the coronal end of the scan post, and be stabilized at any desired depth of insertion inside the hole. For example, the bite pillar may be supported inside the hole by friction. According to some embodiments, a locking mechanism such as a screw through the scan post perpendicular to the longitudinal axis may be used to stabilize the bite pillar inside the hole.

According to some embodiments, the hole is threaded by an internal thread extending along at least a portion of the hole proximal the coronal end thereof and the bite pillar comprises a threaded screw near the pillar apical end extending along an apical portion of the bite pillar.

The threaded screw is configured to fit to the thread of the hole in the scan post, to allow tunably inserting the bite pillar into the scan post by screwing.

It is noted that by the bite registration device being configured to connect to a dental implant, it is meant to include also embodiments capable of connecting to a dental implant replica, or to an abutment configured to connect to a dental implant or to a dental implant replica as is further detailed and explained herein below. The bite registration device is configured to connect, in general, to any rigid component which may require position registration relative to objects in a patient's mouth by way of an intra-oral scan or an extra-oral scan, as should be appreciated by the person skilled in the art of digital scanning and prosthetic implant dentistry.

According to some embodiments the scan post's body further comprises a cylindrical portion extending between the connection interface portion and the conical portion. According to some embodiments, the hole in the body is a through hole, and the body comprises an internal shoulder in the through hole configured to support a bolt disposed in the through hole from above, to connect the scan post to the implant.

According to some embodiments the bite pillar further comprises a pillar head above the threaded screw and proximal to the pillar coronal end, the pillar head having a larger diameter than a diameter of the threaded screw. According to some embodiments the pillar head is slotted along a rim thereof. According to some embodiments the pillar head comprises a bite platform depressed from the pillar coronal end for containing a mold material therein.

There is also provided according to further embodiments of the invention an esthetic device configured to enable registration of a Low-Lip line (LL) and/or a High-Lip line (HL) and/or a facial mid-line in a digital scan of a patient's mouth. The esthetic device comprises a ruler extending between a ruler top end and a ruler bottom end and possibly a scale marked on the ruler. The esthetic device further comprises a top slide ruler and a bottom slide ruler, each being configured to slide along the ruler, substantially parallel to the scale. According to some embodiments the esthetic device further comprises an incisive papilla rest positioned near the ruler top end, substantially perpendicular to the ruler, and configured to rest against the incisive papilla of the patient when the esthetic device is used as described herein.

According to some embodiments the slide rulers are each marked by a scannable mark such as a bulge or a slit, respectively, the slit enabling view and access of the scale underneath the slide rulers. According to some embodiments the slide rulers and at least a portion of the ruler are made of a material detectable in an intra-oral scan or an extra-oral scan. According to some embodiments the slide rulers and/or at least a portion of the ruler are made of a polymer material, e.g. polyether ether ketone (PEEK) or Poly (methyl methacrylate) (PMMA).

There is also provided according to further example embodiments of the invention a method for planning or producing oral or maxillofacial restorative products, comprising providing a bite registration device according to the teachings herein. The method further comprises connecting the scan post of the bite registration device to an implant or to an implant replica installed in a jaw of a patient's mouth or in a model or connecting the scan post to an abutment connected to an implant or to an implant replica installed in a jaw of a patient's mouth or in a model. The method further comprises tunably connecting the bite pillar to the scan post, and until a desired height is obtained, iteratively refining the height of a pillar coronal end of the bite pillar above a coronal end of the scan post, e.g. by tunably inserting and exerting the bite pillar in the scan post, e.g. by screwing, and inspecting the said height by joining the jaw with an opposite jaw.

According to still other example embodiments of the invention there is provided a method for planning or producing oral or maxillofacial restorative products, comprising advancing an esthetic device comprising a ruler and one or more slide rulers configured to slide along the ruler, to a patent's face. While the esthetic device is proximal the patient's face, performing a digital oral scan of the patient's mouth (in order to register in the same visit, the major esthetic parameters of the patient's mouth, the implant position scan and the digital bite registration).

The scan results thereby indicate spatial locations of scan-detectable objects in the patient's mouth and also spatial location of the one or more slide rulers of the esthetic device, in a single computerized file (or 3D file of the patient's dental record). According to some embodiments, the scan-detectable objects in the patient's mouth may include for example a tooth or an artificial tooth or a scan post or a bite-pillar, or some, or all of the above.

According to an aspect of some embodiments of the present invention there is provided a bite registration device including a scan post configured to attach to a dental implant, a bite pillar configured to be attached at a coronal end of the scan post, and a mechanism for attaching the bite pillar to the scan post, wherein the mechanism enables adjustment of a distance from a coronal end of the bite pillar to an apical end of the scan post.

According to some embodiments of the invention, the bite pillar is attached to the scan post by a screw thread. According to some embodiments of the invention, the mechanism includes a bite pillar portion configured to attach to a hole in the scan post by friction.

According to some embodiments of the invention, the bite pillar includes a wide coronal end, wider than a body of the bite pillar. According to some embodiments of the invention, the wide coronal end is configured for a bite registration function.

According to some embodiments of the invention, the wide coronal end further includes a bite platform depression on the wide coronal end configures to contain a mold material.

According to some embodiments of the invention, a side of the coronal end of the bite pillar is knurled for gripping and screwing the bite pillar onto the scan post.

According to some embodiments of the invention, the mechanism includes an externally threaded screw in an apical portion of the bite pillar for screwing into a threaded hole in the scan post.

According to some embodiments of the invention, the mechanism includes a threaded hole in the bite pillar for screwing onto a threaded screw on the scan post.

According to some embodiments of the invention, the mechanism further includes a locking mechanism configured to prevent changing the distance from the coronal end of the bite pillar to the apical end of the scan post after adjustment.

According to some embodiments of the invention, the scan post includes a scan post body with a through-hole and further including a screw for inserting through the through-hole and connecting the scan post to a dental implant.

According to an aspect of some embodiments of the present invention there is provided a bite pillar including a wide coronal end and an elongate shape configured to attach to an object in a mouth of a patient.

According to some embodiments of the invention, the object is an object selected from a group consisting of a scan post, a dental abutment, a dental implant analog, and a dental implant.

According to some embodiments of the invention, the elongate shape includes a screw thread configured to screw to the object.

According to some embodiments of the invention, the wide coronal end further includes a bite platform depressed from the wide coronal end for containing a mold material.

According to some embodiments of the invention, the bite pillar includes a threaded hole configured to screw onto a screw protruding from the object.

According to some embodiments of the invention, the bite pillar includes a screw protruding down from the wide coronal end, the screw shaped and sized to screw into a threaded hole in the object.

According to some embodiments of the invention, the bite pillar includes a material which is detectable by an oral scanner.

According to an aspect of some embodiments of the present invention there is provided a scan post including a screw thread for attaching a bite pillar thereto.

According to some embodiments of the invention, the scan post includes a scan post body with a through-hole and further including a screw for inserting through the through-hole and connecting to an object in a mouth of a patient.

According to some embodiments of the invention, the object is an object selected from a group consisting of a dental implant, a dental implant analog, and a dental abutment.

According to some embodiments of the invention, the screw thread for attaching the bite pillar includes a threaded hole.

According to some embodiments of the invention, the screw thread for attaching the bite pillar includes threading on an outside of the scan post.

According to an aspect of some embodiments of the present invention there is provided a method for mouth model registration including attaching a scan post to a dental implant in a patient jaw, attaching a bite pillar to the scan post, adjusting a distance of a coronal end of the bite pillar to the apical end of the scan post to a desired distance, and scanning a three-dimensional scan of the patient's jaw with the bite pillar and the scan post attached thereto.

According to some embodiments of the invention, the attaching the scan post to the dental implant and the attaching the bite pillar to the scan post includes attaching a bite pillar already attached to the scan post to the dental implant.

According to some embodiments of the invention, the adjusting includes adjusting the bite pillar to achieve correct bite closure when the patient's jaw is closed against the patient's other jaw.

According to some embodiments of the invention, the adjusting includes iteratively adjusting the bite pillar to achieve correct bite closure.

According to some embodiments of the invention, the adjusting includes iteratively adjusting the bite pillar until it is stopped by an object selected from a group consisting of a natural tooth, an antagonist bite pillar, an object fixed in the patient's mouth.

According to some embodiments of the invention, further including locking adjustment of the distance.

According to some embodiments of the invention, further including performing an oral scan of both of the patient's jaws with the bite pillar and the scan post attached to the patient's jaw.

According to some embodiments of the invention, further including aligning a three-dimensional model of a top jaw based on the three-dimensional scan and a three-dimensional model of a bottom jaw based on the three-dimensional scan, obtaining a three-dimensional model of both jaws with a specific bite distance.

According to some embodiments of the invention, the attaching the bite pillar and the scan post includes attaching a plurality of bite pillars and corresponding scan posts to a plurality of dental implants in a patient jaw, and the adjusting a distance of a coronal end of the bite pillar to the apical end of the scan post to a desired distance includes adjusting distances of coronal ends of the bite pillars to apical ends of the plurality of the corresponding scan posts.

According to some embodiments of the invention, at least a first one of the plurality of bite pillars and corresponding scan posts is attached to a different jaw then at least a second one of the plurality of bite pillars and corresponding scan posts.

According to some embodiments of the invention, at least a first one of the plurality of bite pillars and corresponding scan posts is attached to a different jaw than at least a second one of the plurality of bite pillars and corresponding scan posts, and the first one of the plurality of bite pillars and corresponding scan posts is attached to a jaw at a tooth location opposite a tooth location of the second one of the plurality of bite pillars and corresponding scan posts which is attached to the different jaw.

According to some embodiments of the invention, further including using the three-dimensional scan of the patient's jaw to align models of each one of both of the patient's jaws, the models being based, at least in part, on the three-dimensional scan.

According to an aspect of some embodiments of the present invention there is provided a method for referencing positions of objects in a mouth including attaching a scan post to a dental implant in a patient jaw, attaching a reference pillar to the scan post, and recording an image of the patient's jaw with the reference pillar and the scan post attached thereto, wherein at least part of the reference pillar is visible in the image, thus referencing positions of objects in a mouth.

According to some embodiments of the invention, the attaching the scan post to the dental implant and the attaching the reference pillar to the scan post includes attaching a reference pillar already attached to the scan post to the dental implant.

According to some embodiments of the invention, the recording an image of the patient's jaw includes recording a two-dimensional image.

According to some embodiments of the invention, further including recording a three-dimensional oral scan, marking the reference pillar in the recorded two-dimensional image, marking the reference pillar in a three-dimensional model produced, at least in part, based on the three-dimensional oral scan, in an identical position as the marking of the recorded image, and aligning the marked three-dimensional model with the marked recorded two-dimensional image.

According to some embodiments of the invention, further including marking the reference pillar in the recorded image, marking the reference pillar in a pre-obtained three-dimensional model, in an identical position as the marking of the recorded image, and aligning the marked three-dimensional model with the marked recorded image.

According to some embodiments of the invention, further including layering a three-dimensional model onto the aligned and marked pre-obtained three-dimensional model and the marked recorded image, for a digital smile design.

According to some embodiments of the invention, further including performing an oral scan of both of the patient's jaws with the reference pillar and corresponding scan post attached to the patient's jaw.

According to some embodiments of the invention, the attaching the reference pillar and corresponding scan post includes attaching a plurality of reference pillars and corresponding scan posts to a plurality of corresponding dental implants in a patient jaw.

According to some embodiments of the invention, at least a first one of the plurality of reference pillars and corresponding scan posts is attached to a different jaw then at least a second one of the plurality of reference pillars and corresponding scan posts.

According to some embodiments of the invention, further including using the image of the patient's jaw to align models of each one of both of the patient's jaws, the models being based, at least in part, on the oral scan.

According to some embodiments of the invention, the attaching a scan post to a dental implant in a patient jaw and the attaching a reference pillar to the scan post includes attaching the reference pillar directly to the dental implant.

According to some embodiments of the invention, the attaching a scan post to a dental implant in a patient jaw and the attaching a reference pillar to the scan post includes attaching the reference pillar to a dental abutment.

According to an aspect of some embodiments of the present invention there is provided a kit including a scan post configured to attach to a dental implant and to a bite pillar, and a bite pillar configured to be attached at a first end to the scan post, wherein a distance from a second, coronal end of the bite pillar to an apical end of the scan post is adjustable. According to some embodiments of the invention, further including a reference pillar.

According to an aspect of some embodiments of the present invention there is provided a reference pillar configured as an elongate shape to be attached at a first end to an object in a mouth of a patient.

According to some embodiments of the invention, the object is an object selected from a group consisting of a scan post, a dental implant, and a dental abutment.

According to some embodiments of the invention, the first end configured to be attached to the object includes a threaded screw.

According to some embodiments of the invention, further including a second end of the reference pillar shaped as a sphere.

According to some embodiments of the invention, the sphere has a diameter greater than a diameter of the reference pillar.

According to some embodiments of the invention, the sphere has a diameter smaller than a diameter of the reference pillar.

According to some embodiments of the invention, a middle portion of the reference pillar includes knurling to enable rotating the reference pillar into the object.

According to some embodiments of the invention, the reference pillar includes a material which is detectable by an oral scanner.

According to an aspect of some embodiments of the present invention there is provided a bite registration device for planning or producing oral or maxillofacial restorative products, including a scan post made of metal or a polymer material, configured to connect to a dental implant, abutment or analog and including a body extending along a longitudinal axis between an apical end and a coronal end and having near the apical end a connection interface portion for connecting to a dental implant, and near the coronal end a conical portion, pointing towards the connection interface portion, the conical portion being sectioned along preferred plains, the body having a hole extending along the longitudinal axis from the coronal end at least along a portion of the scan post's length, and a bite pillar extending between a pillar apical end and a pillar coronal end and including an apical portion proximal the apical end, the apical portion being dimensioned and configured to be tunably inserted into the through hole of the scan post.

According to some embodiments of the invention, the bite pillar is supported inside the hole by friction.

According to some embodiments of the invention, further including a locking mechanism for stabilizing the bite pillar inside the hole.

According to some embodiments of the invention, the hole is a through hole extending between the coronal end and the apical end of the body.

According to some embodiments of the invention, the hole is threaded by an internal thread extending along a portion of the hole proximal the coronal end, and the bite pillar includes a threaded screw near the pillar apical end extending along an apical portion of the bite pillar, the threaded screw being configured to fit to the thread of the hole in the scan post, to allow screwing the bite pillar into the scan post.

According to some embodiments of the invention, the body of the scan post further includes a cylindrical portion extending between the connection interface portion and the conical portion.

According to some embodiments of the invention, the body includes an internal shoulder in the through hole configured to support a bolt disposed in the through hole from above, to connect the scan post to the implant.

According to some embodiments of the invention, the bite pillar further includes a pillar head at the pillar coronal end, the pillar head having a larger diameter than a diameter of the apical portion of the bite pillar.

According to some embodiments of the invention, the pillar head is slotted along a rim thereof.

According to some embodiments of the invention, the pillar head includes a bite platform depressed from the pillar coronal end for containing a mold material therein.

According to an aspect of some embodiments of the present invention there is provided an esthetic device configured to enable digital registration of incisive papilla and/or a facial mid-line and/or a Low-Lip line (LL) and/or a High-Lip line (HL) in a digital scan of a patient's mouth, including a ruler, and a top slide ruler and a bottom slide ruler, the slide rulers being configured to slide along the ruler.

According to some embodiments of the invention, further including an incisive papilla rest positioned near a ruler top end of the ruler, substantially perpendicular to the ruler, and configured to rest against the incisive papilla of the patient when the esthetic device is used.

According to some embodiments of the invention, the slide rulers are marked by marks detectable in an oral scan.

According to an aspect of some embodiments of the present invention there is provided a method for planning or producing oral or maxillofacial restorative products, including providing the above-described bite registration device, connecting the scan post to an implant or to an implant replica installed in a jaw of a patient's mouth or in a model or to an abutment connected to dental implant or to an implant replica installed in a jaw of a patient's mouth or in a model, tunably inserting the bite pillar into the through-hole of the scan post, and until a desired gap is obtained, iteratively refining the gap of the pillar coronal end of the bite pillar above the coronal end of the scan post by tunably inserting and excreting the bite pillar in the scan post, and joining the jaw with an opposite jaw.

According to an aspect of some embodiments of the present invention there is provided a method for planning or producing oral or maxillofacial restorative products, including advancing an esthetic device including a ruler and one or more slide rulers configured to slide along the ruler, to a patent's face, and while the esthetic device is proximal the patient's face, performing a digital oral scan of the patient's mouth, the scan results thereby indicate spatial locations of scan-detectable objects in the patient's mouth and spatial location of the one or more slide rulers in a single computerized file.

According to some embodiments of the invention, the scan-detectable objects in the patient's mouth include one or more from the group consisting of a tooth, an artificial tooth, a scan post a bite-pillar and a reference pillar.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims.

The following detailed description should be read with reference to the drawings in which similar elements in different drawings are numbered the same. The detailed description and the drawings, which are not necessarily to scale, depict illustrative embodiments and are not intended to limit the scope of the invention. The depicted embodiments are intended only as exemplary demonstrations of devices and methods disclosed herein. Selected features of any illustrative embodiment may be incorporated into other embodiment unless clearly stated to the contrary.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are described herein with reference to the accompanying figures. The description, together with the figures, makes apparent to a person having ordinary skill in the art of dental implant dentistry how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the Figures:

Figure 1A:
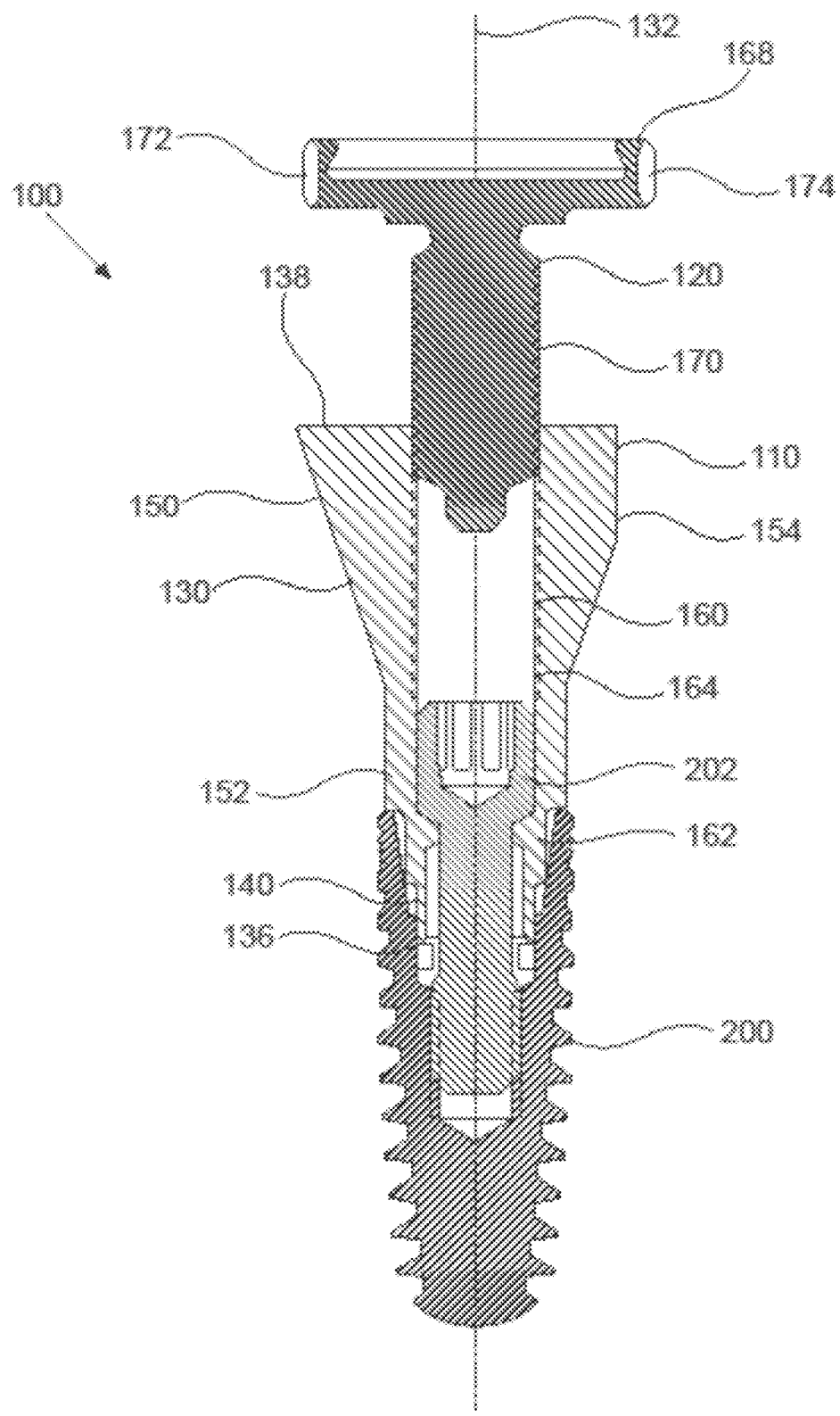
Figure 1C:
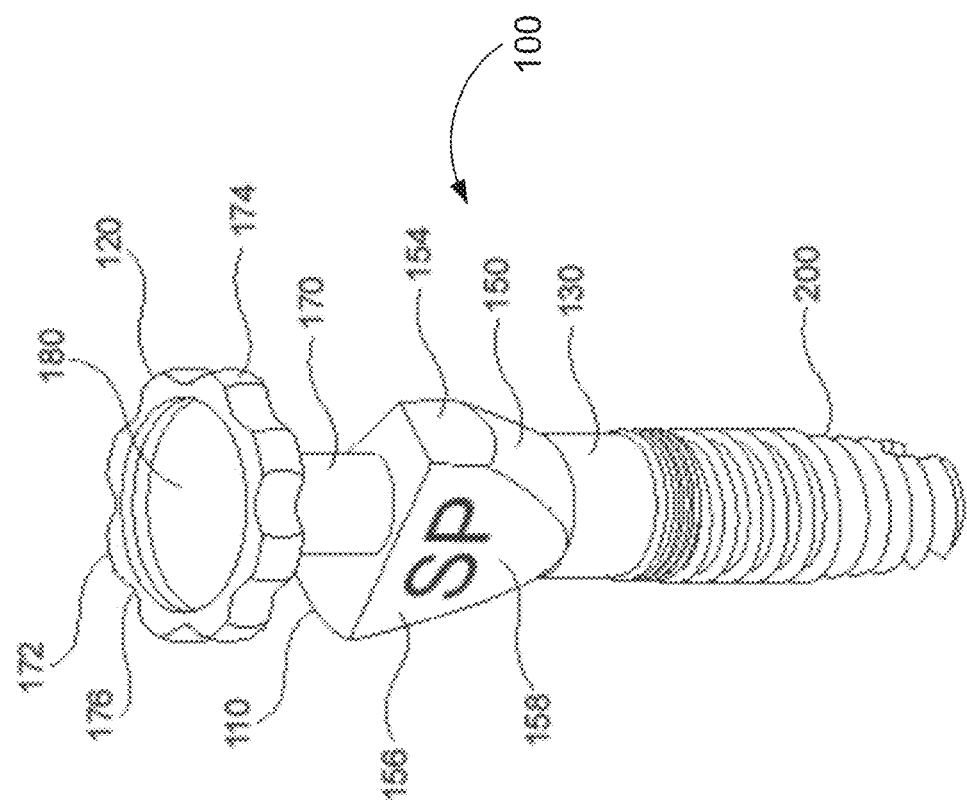
Figure 1B:
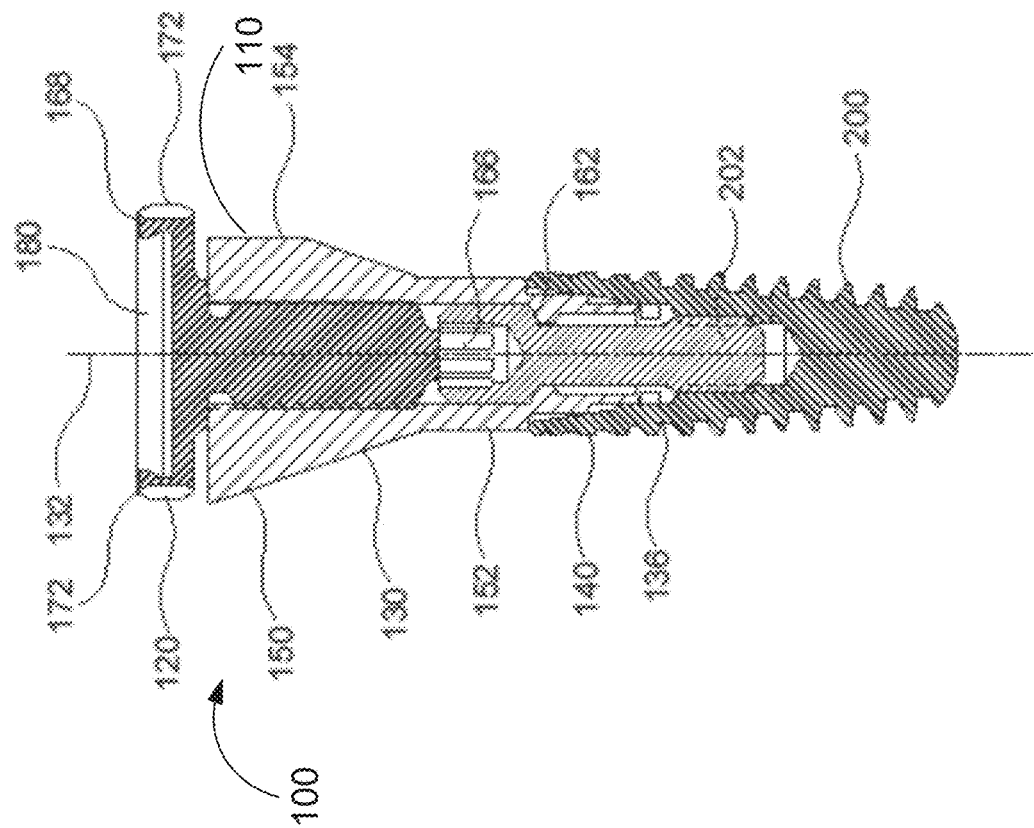
Figure 1D:
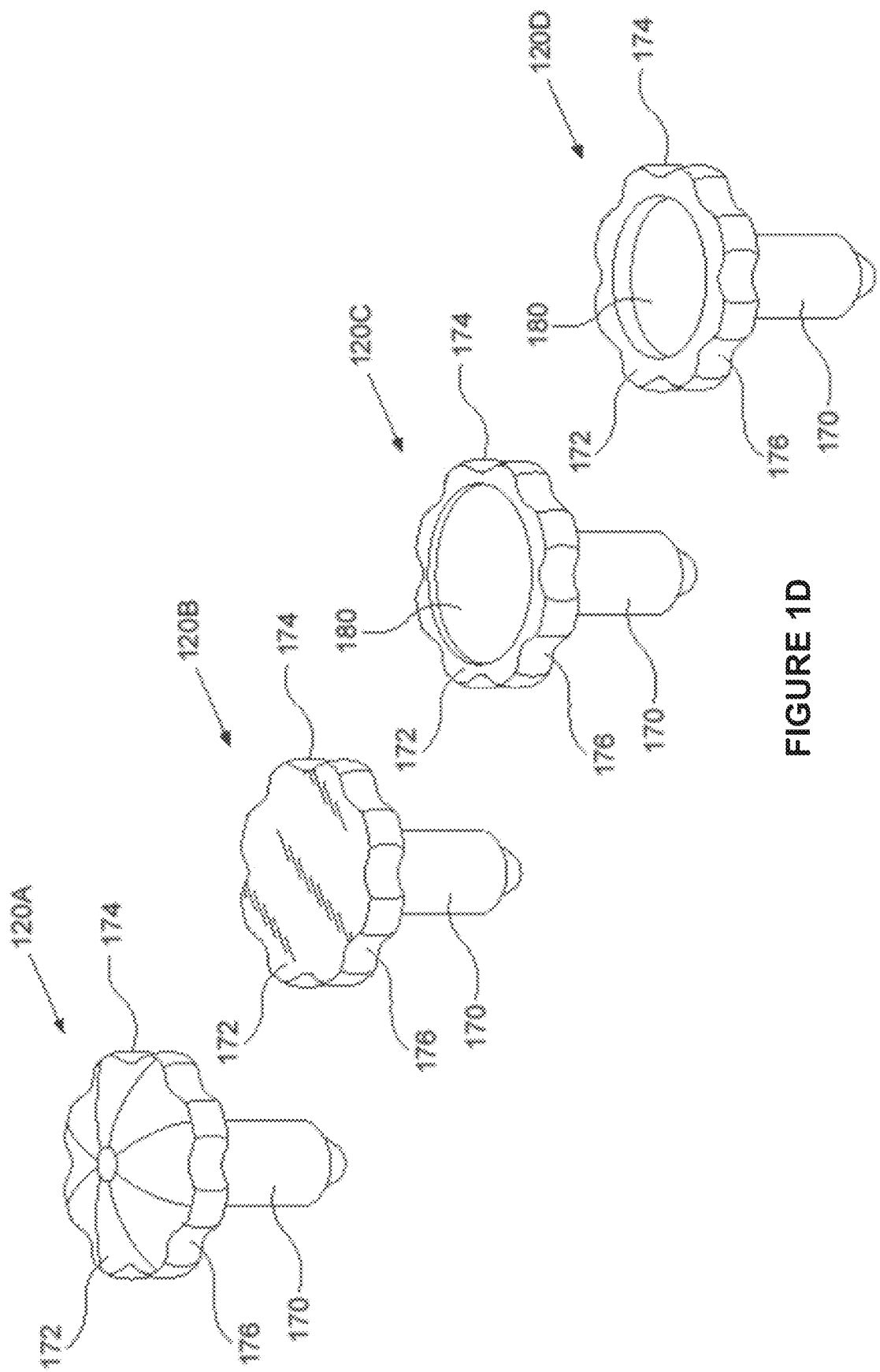
Figure 2:
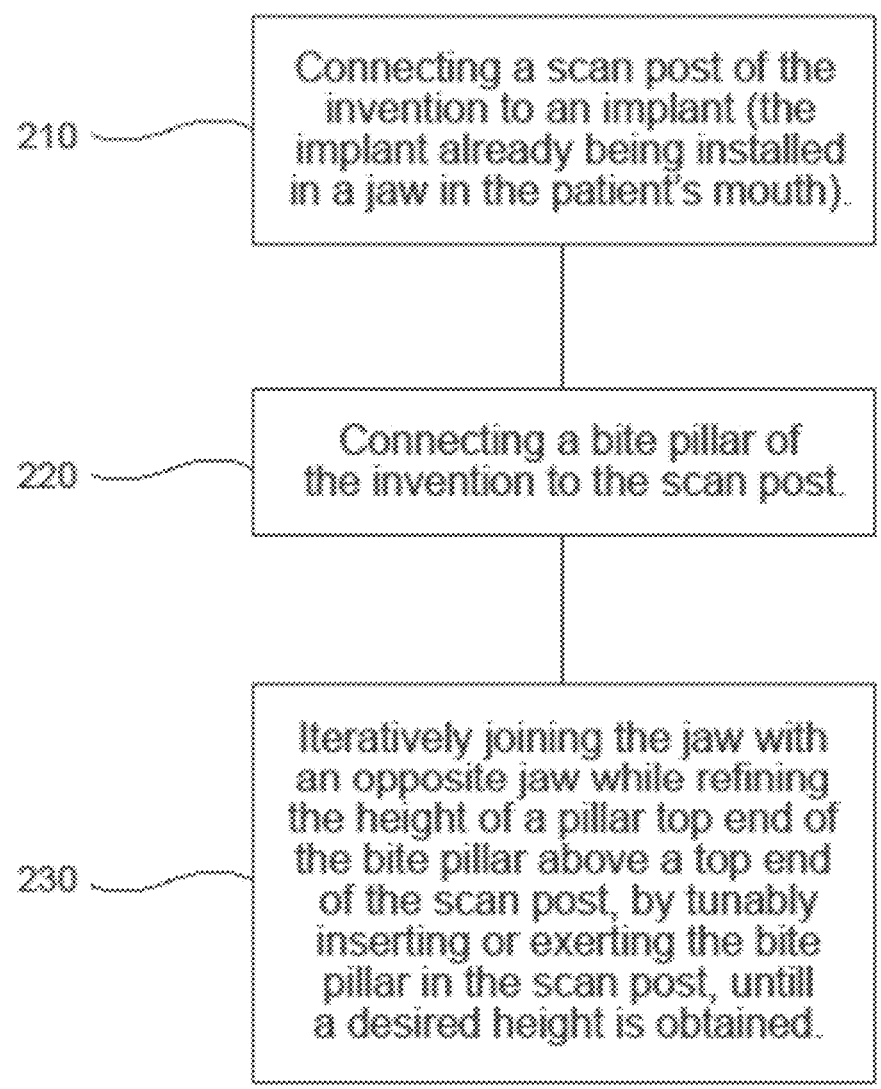
Figure 3A:
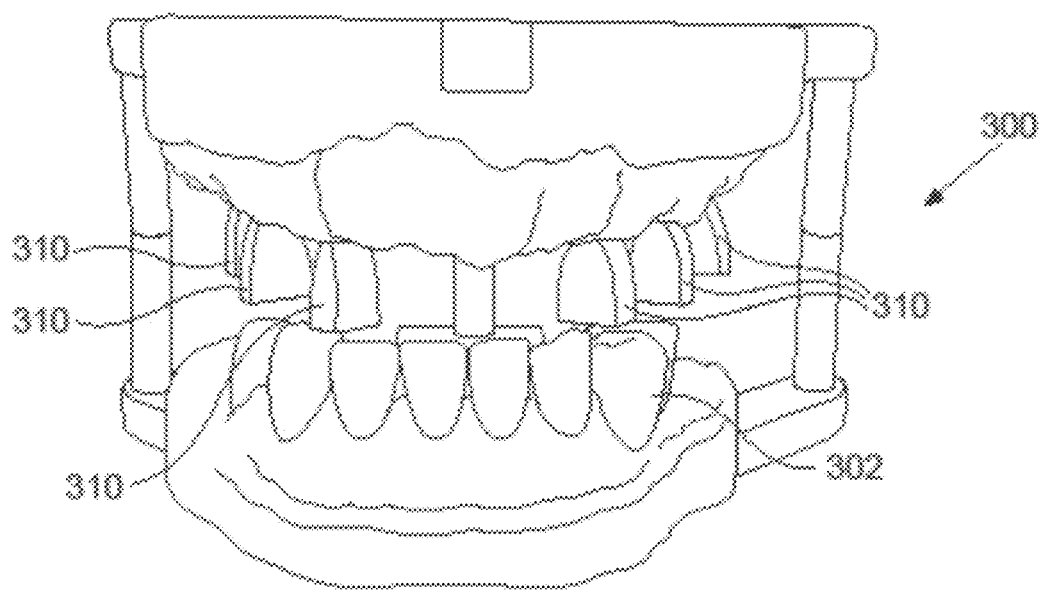
Figure 3B:
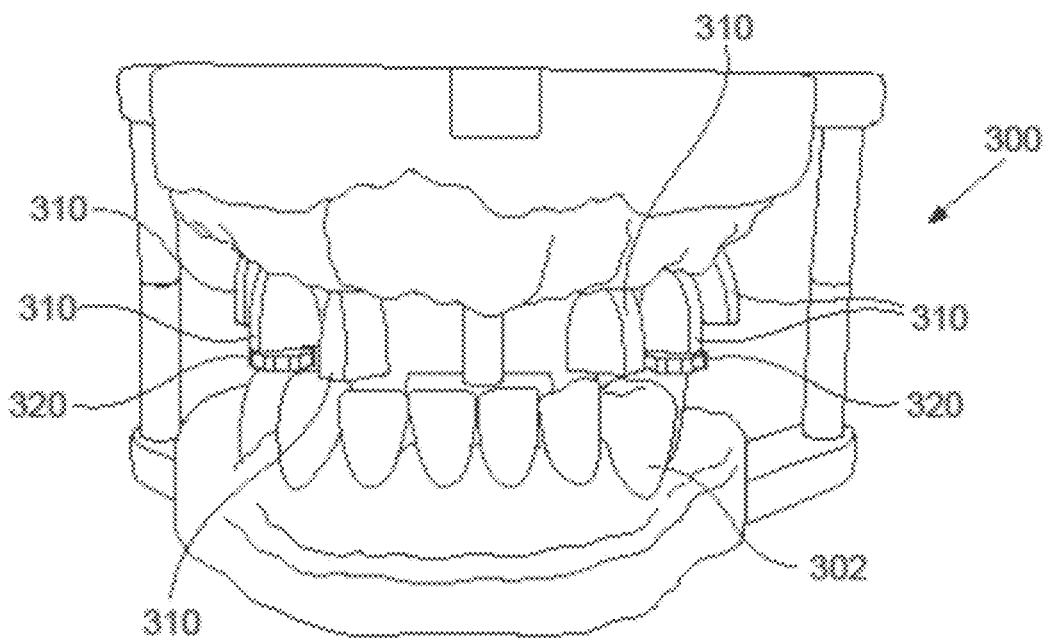
Figure 3C:
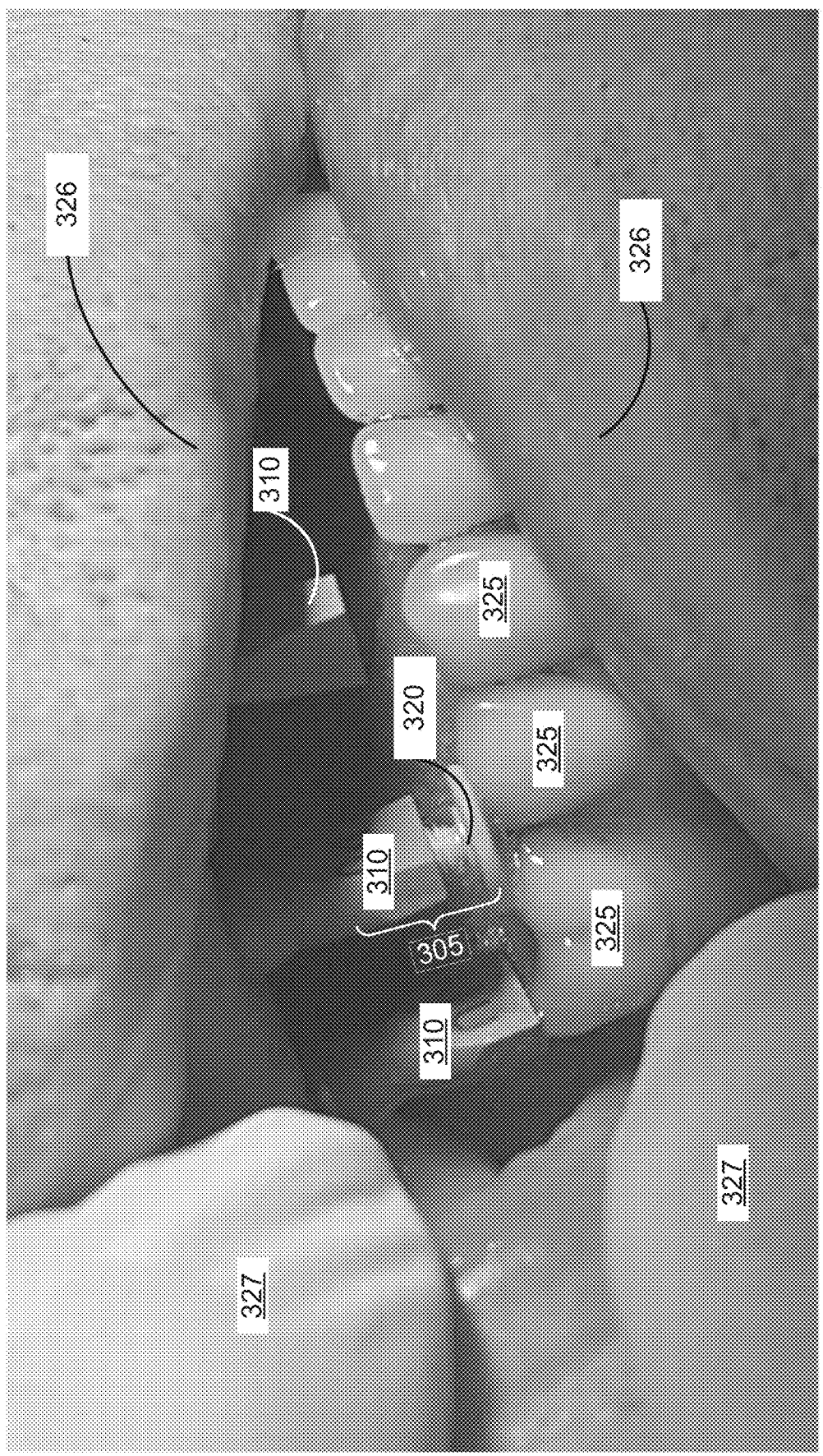
Figure 3D:
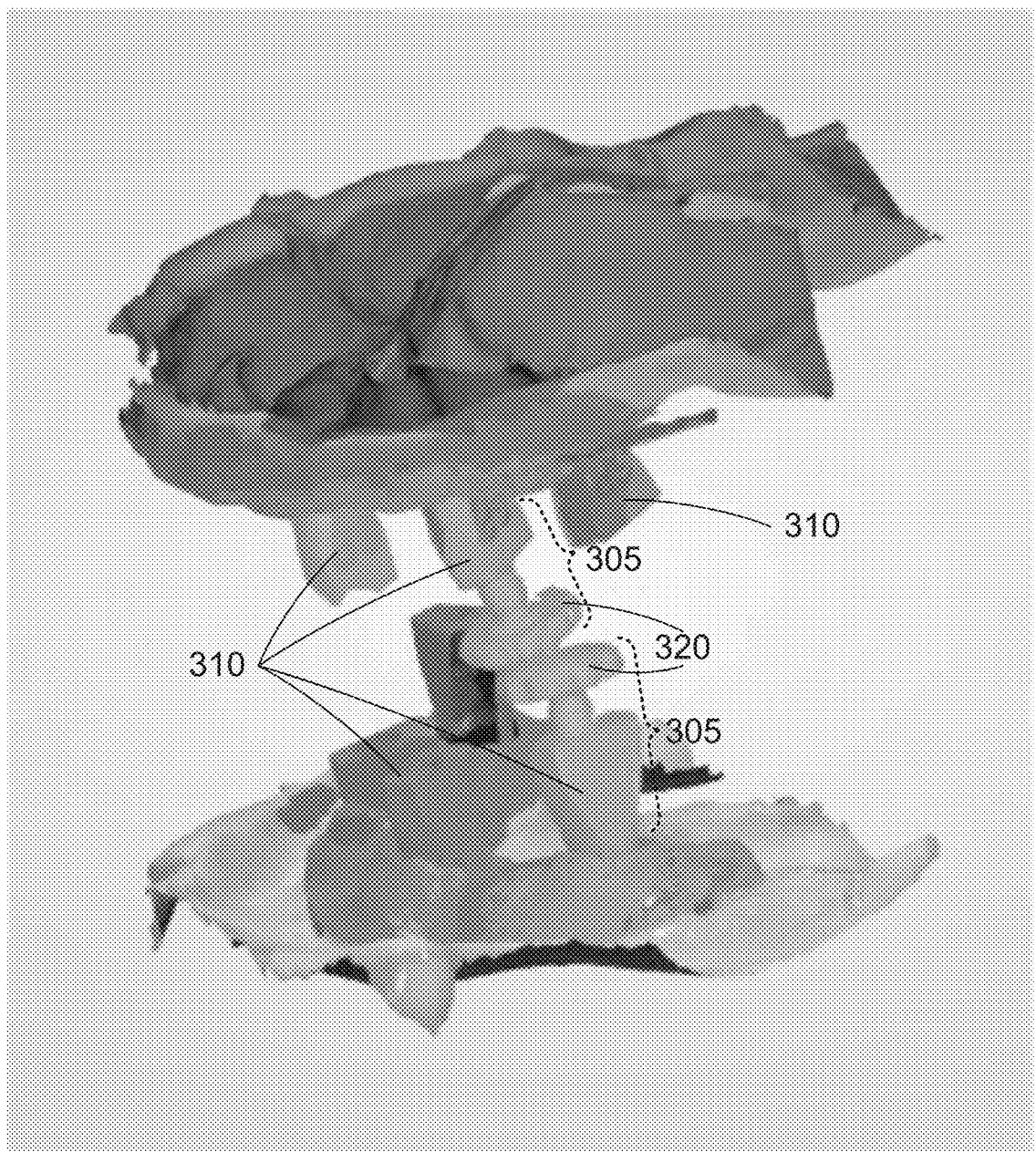
Figure 3E:
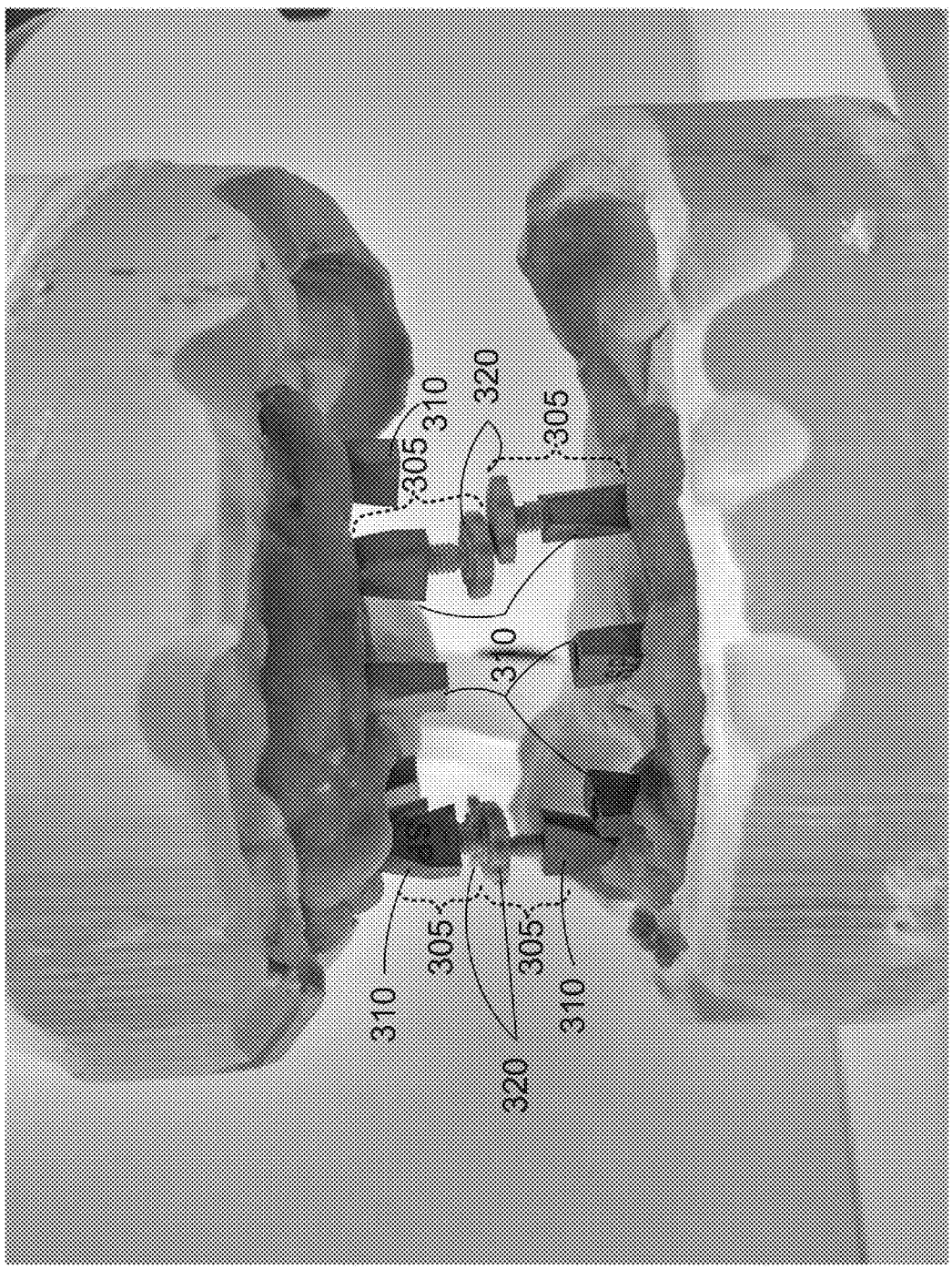
Figure 3F:
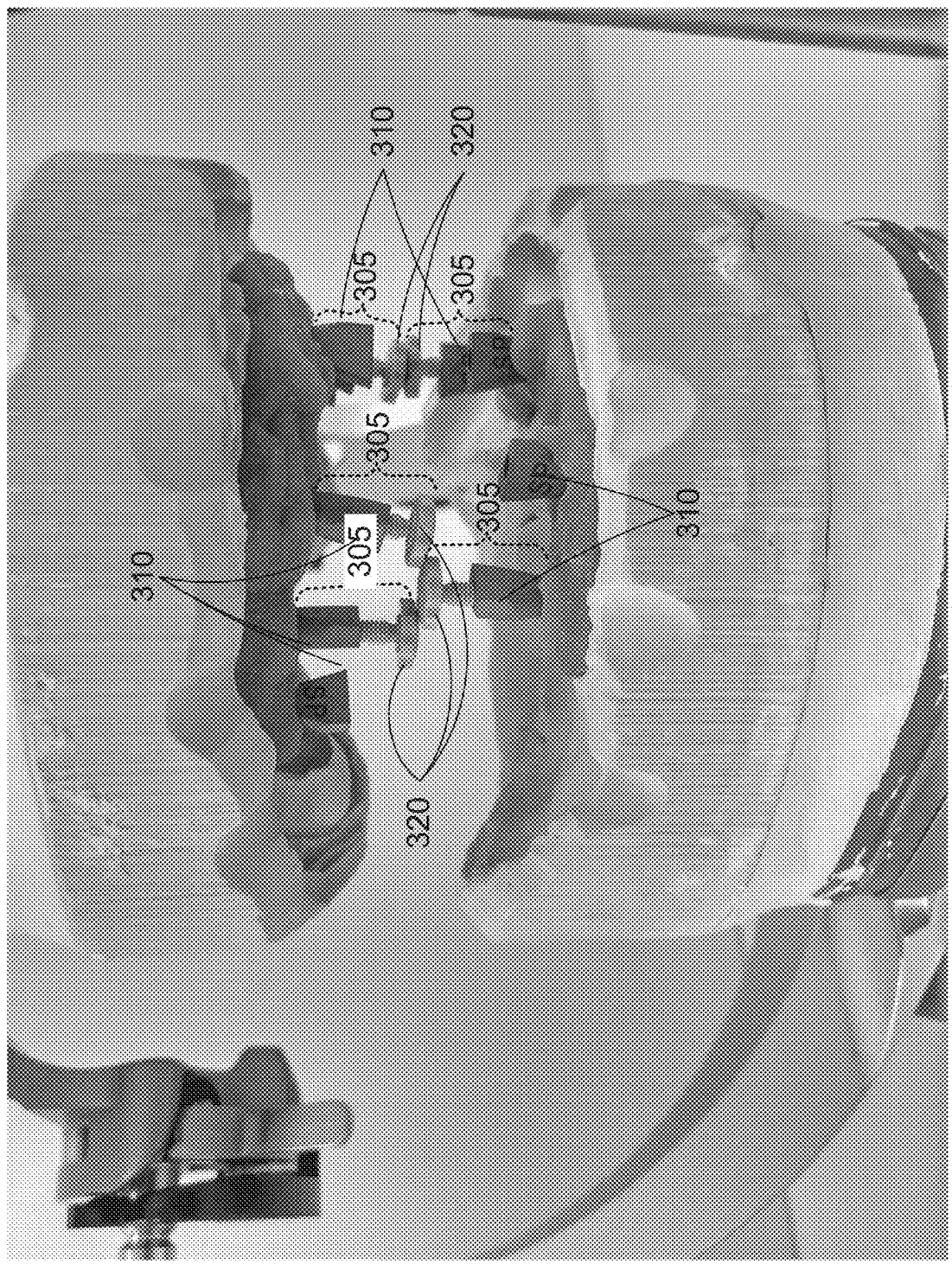
Figures 6A, 6B:
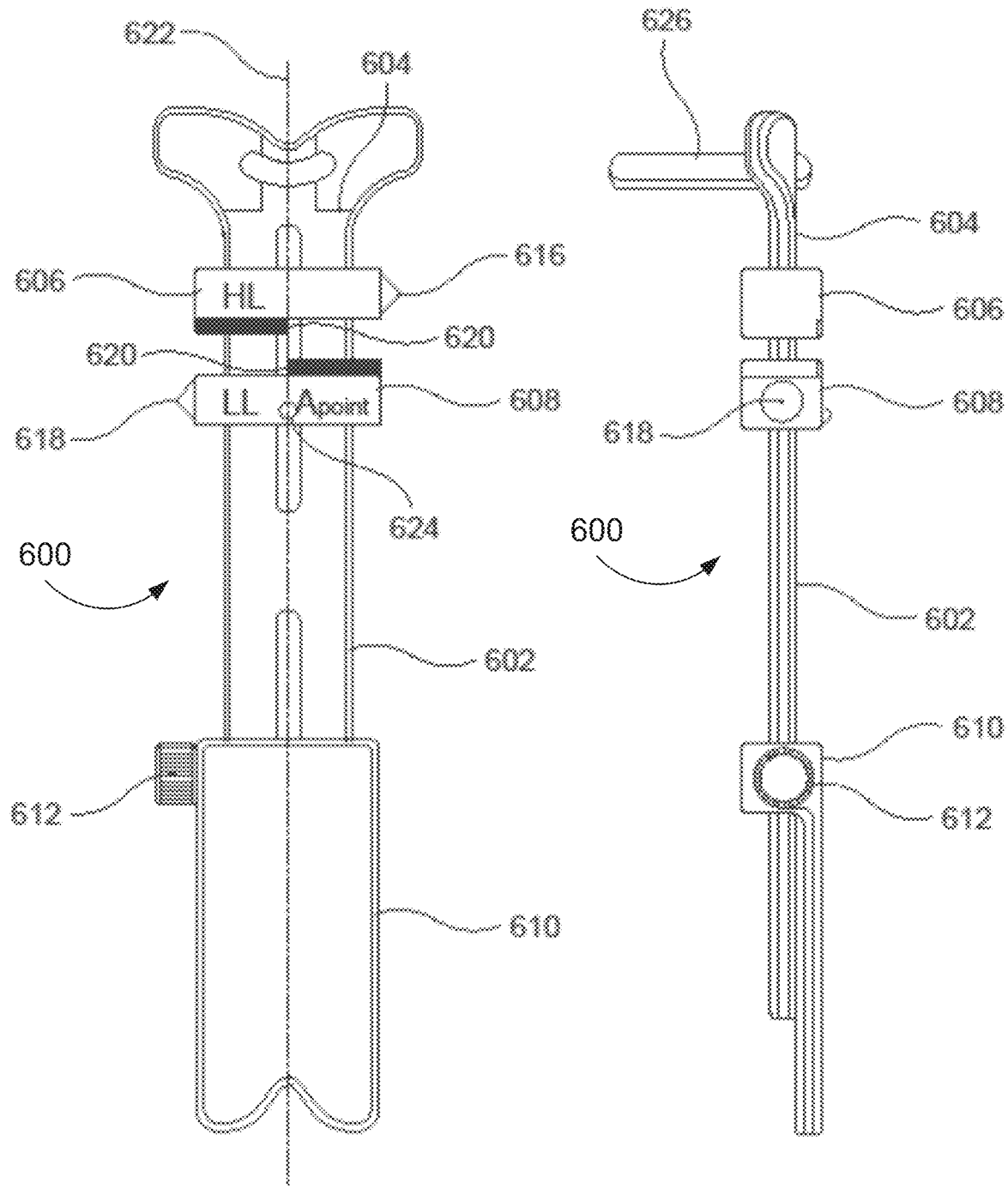
Figure 8:
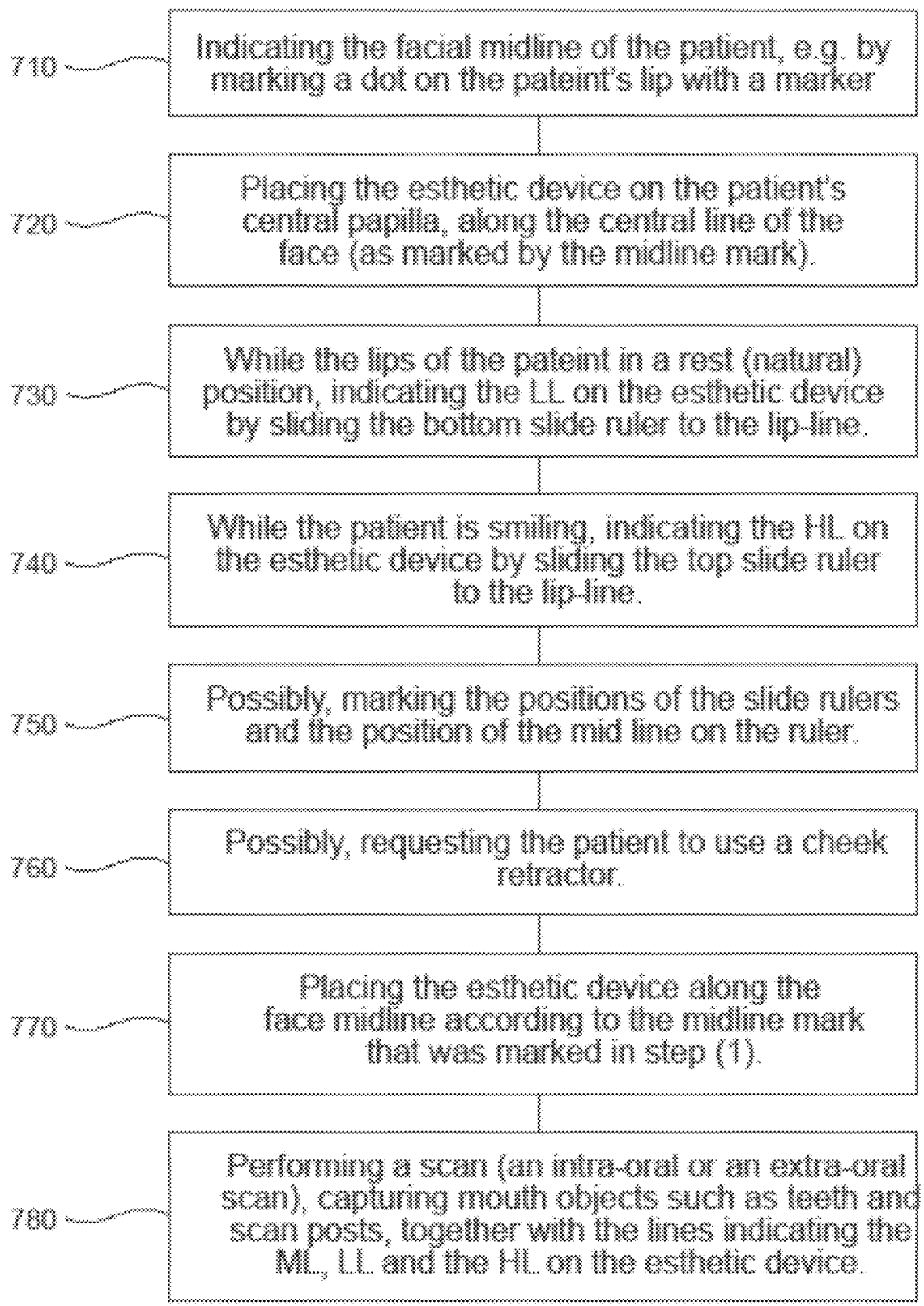
Figure 9A:
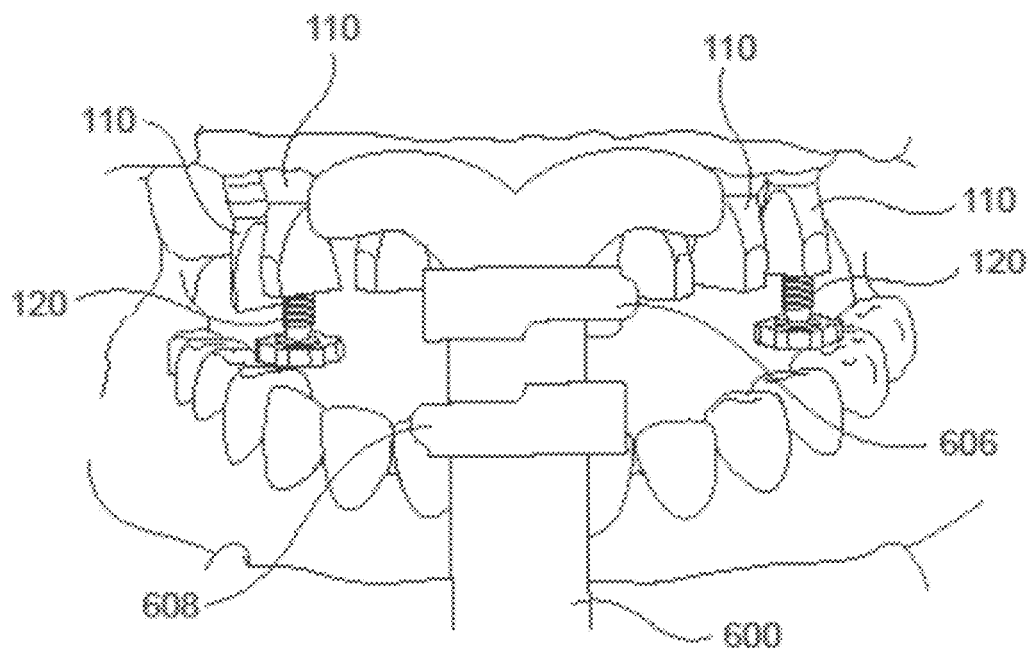
Figure 9B:
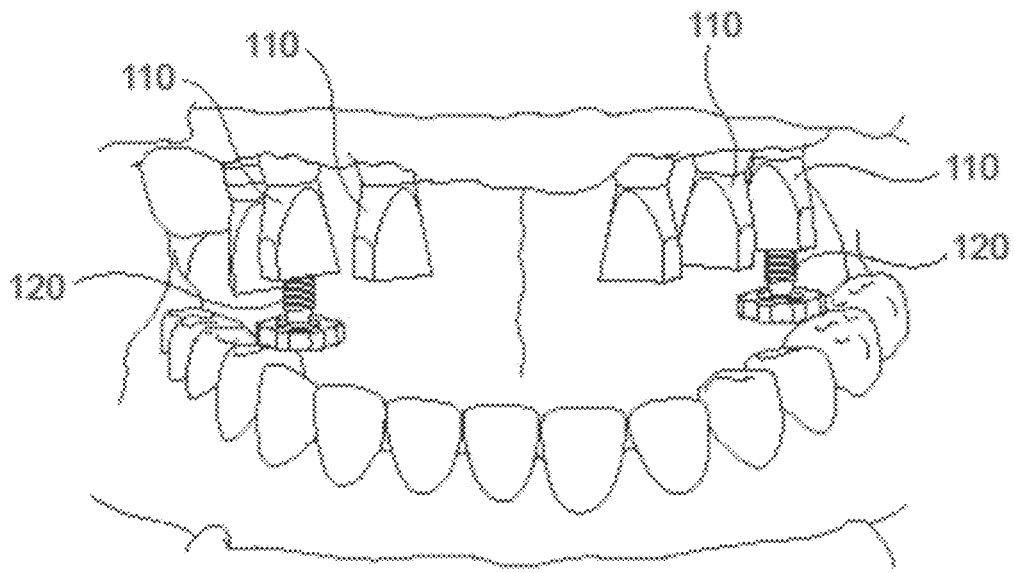
Figure 10B:
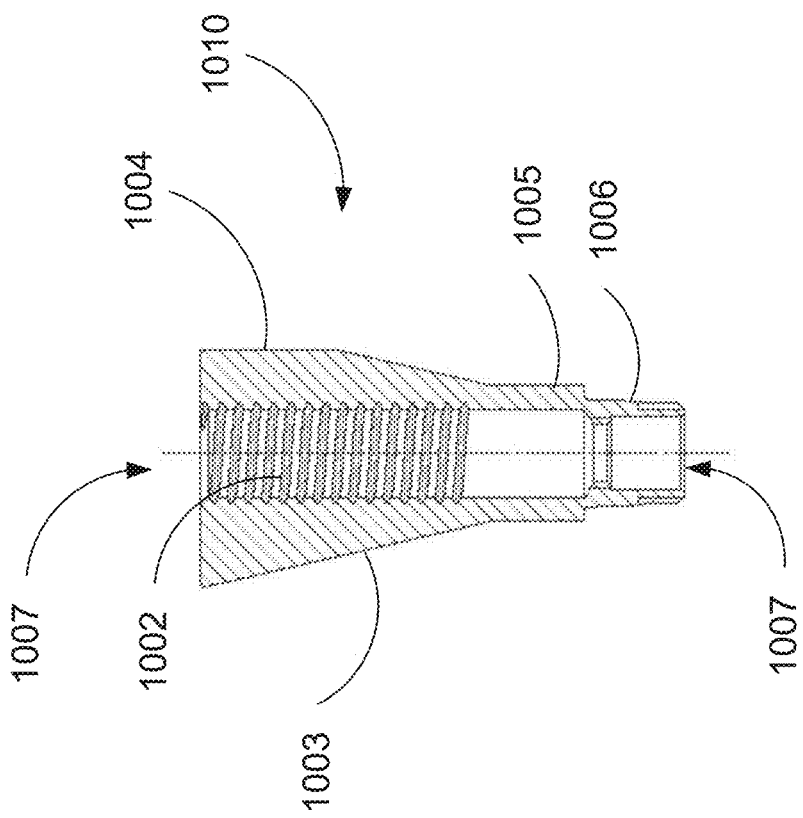
Figure 10A:
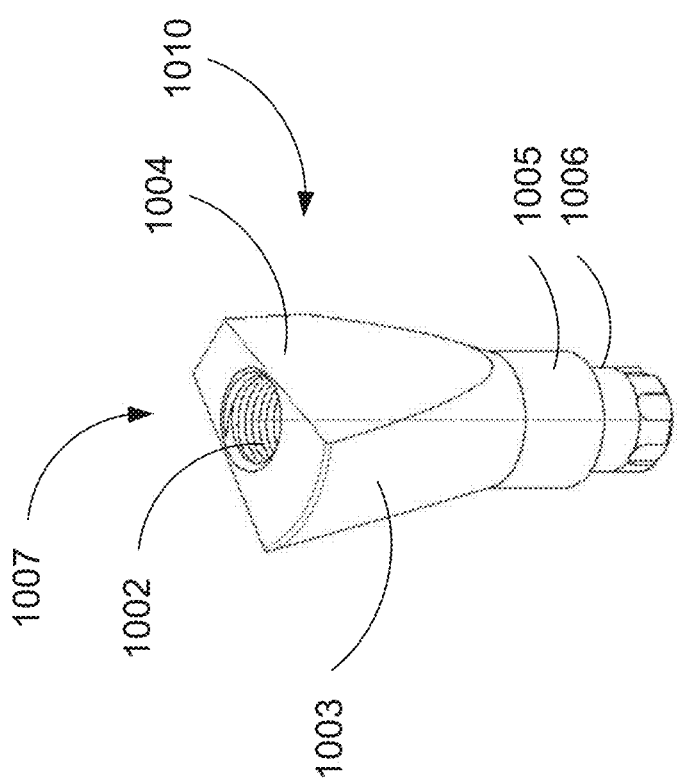
Figure 13C:
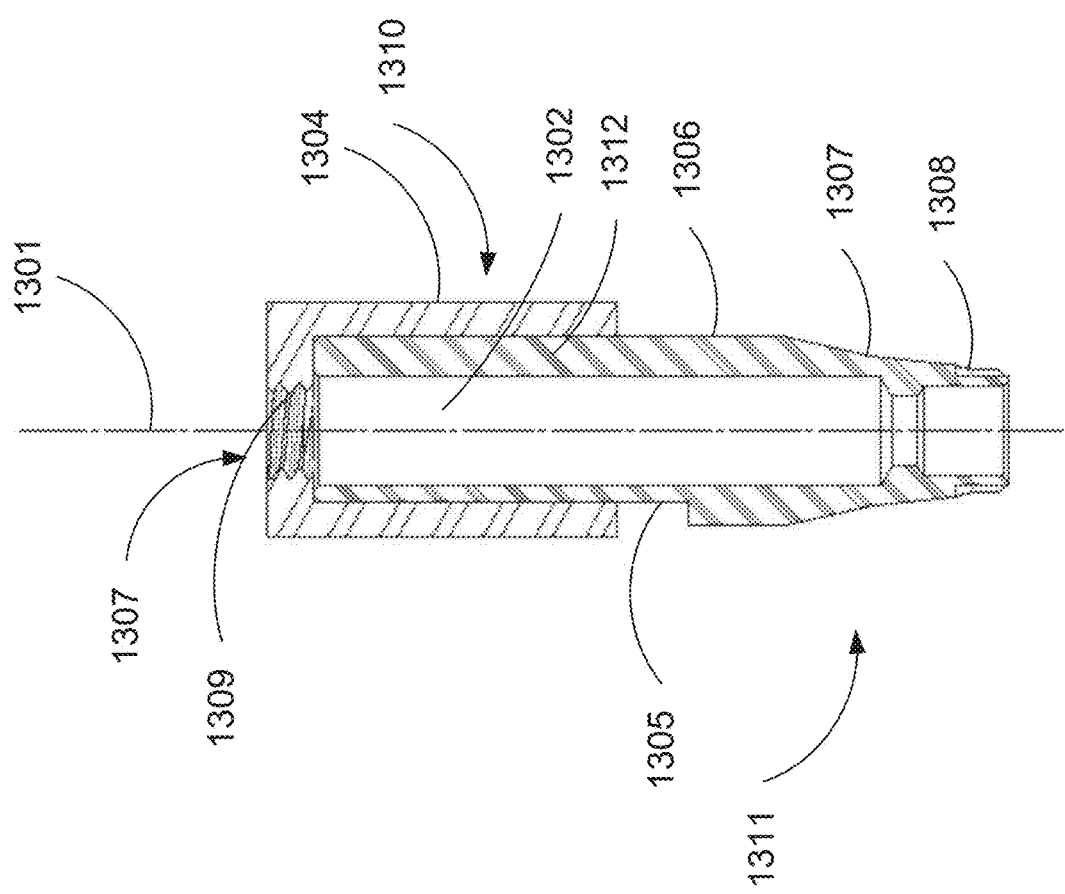
Figure 15:
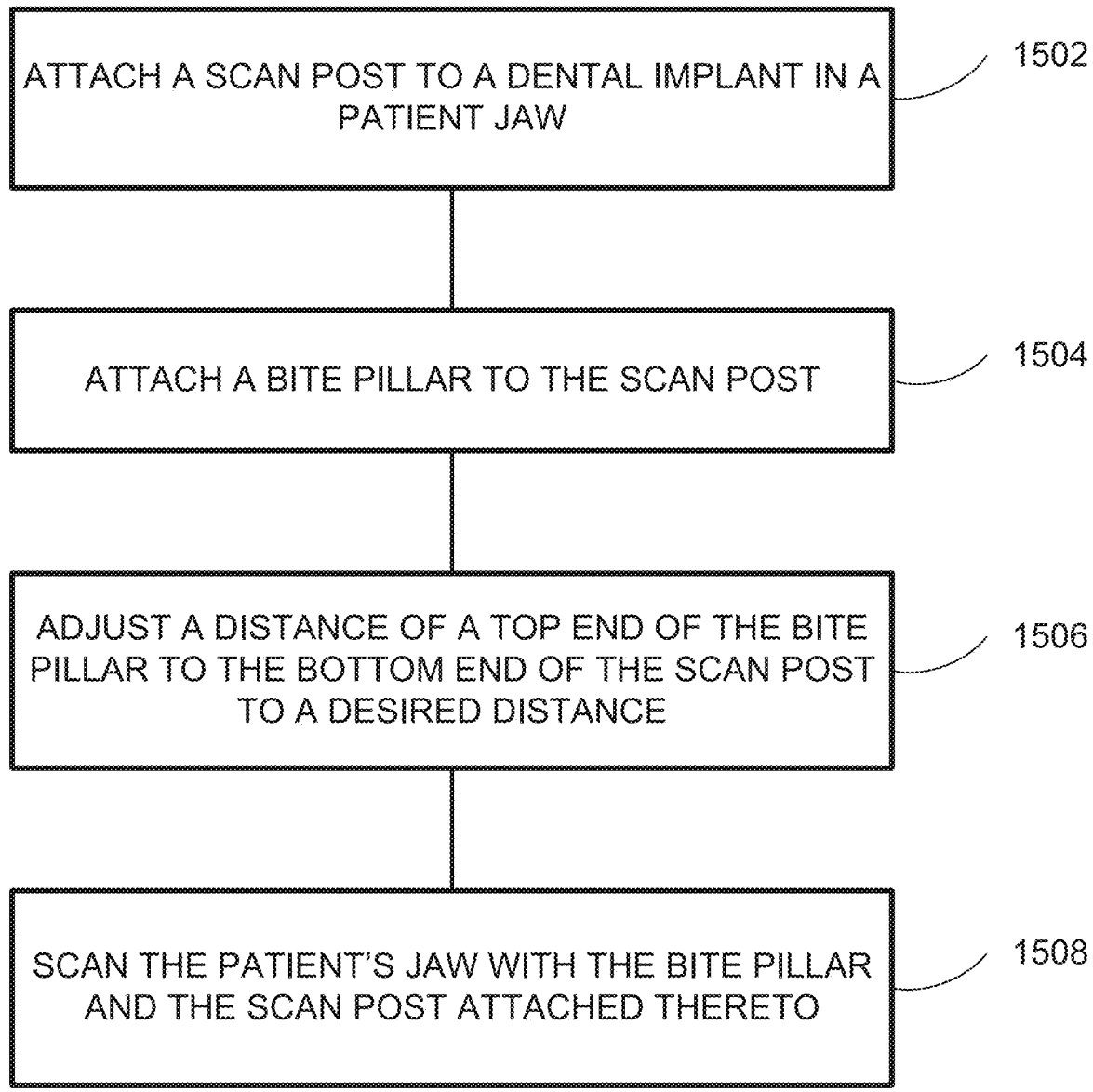
Figure 16:
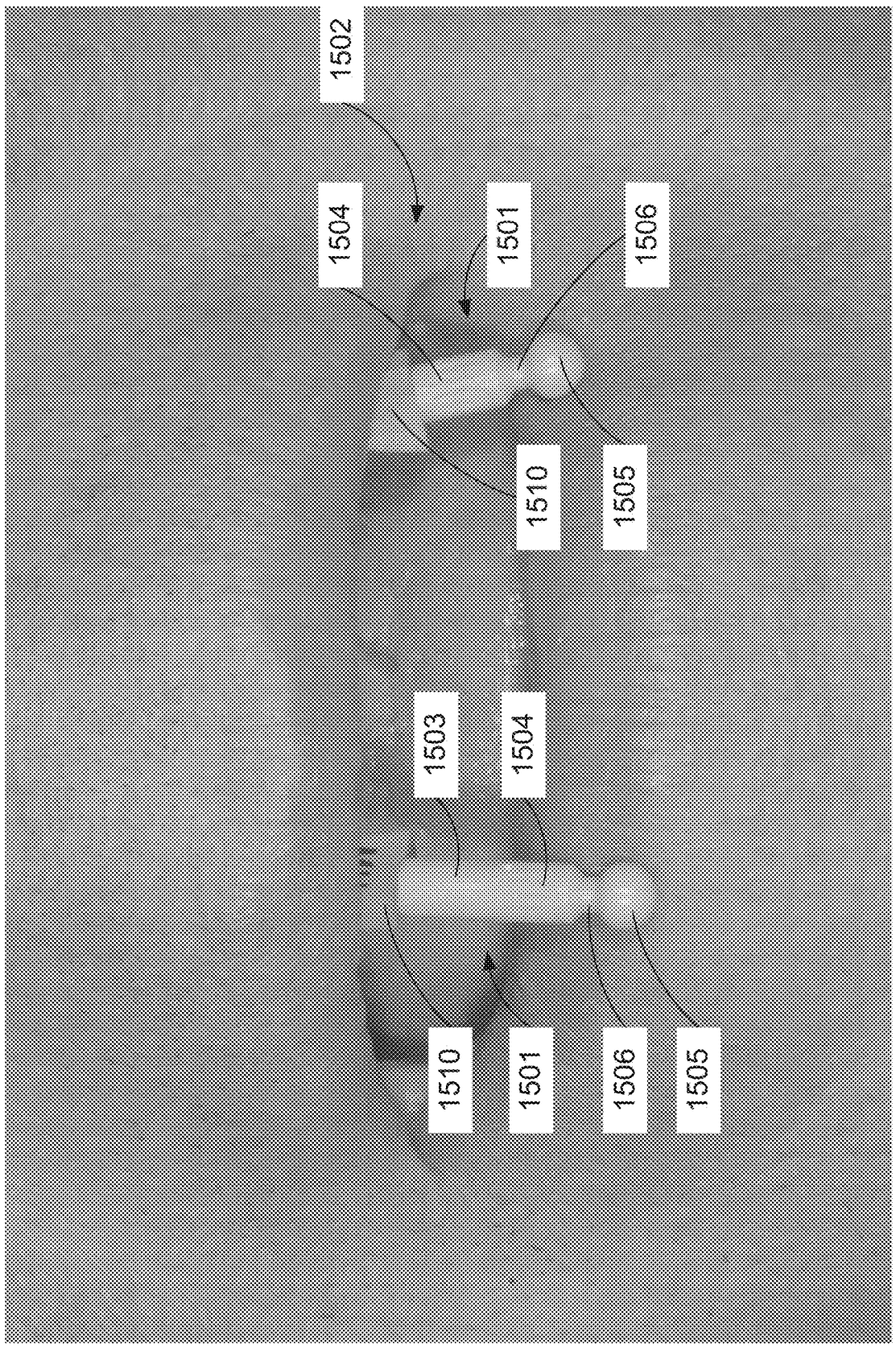
Figure 22B:
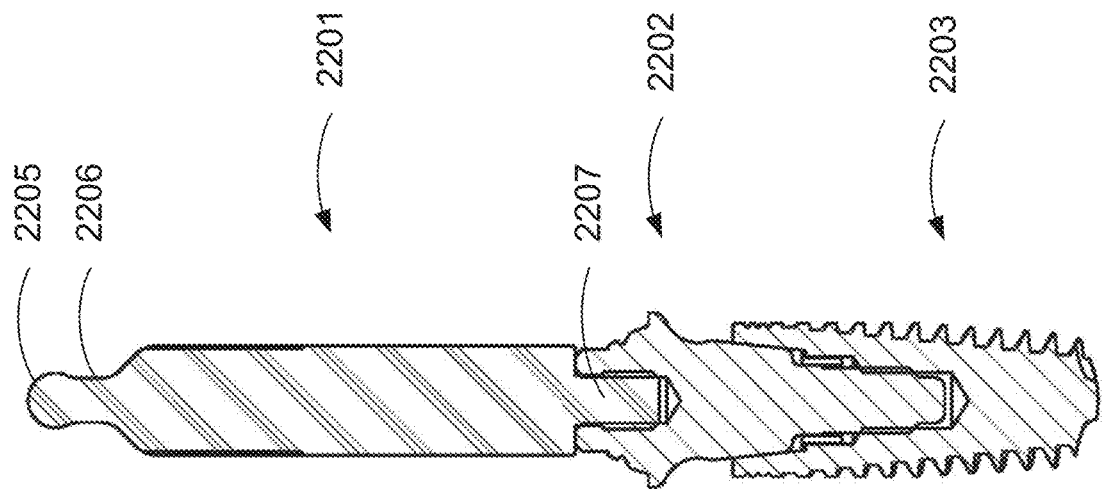
Figure 22A:
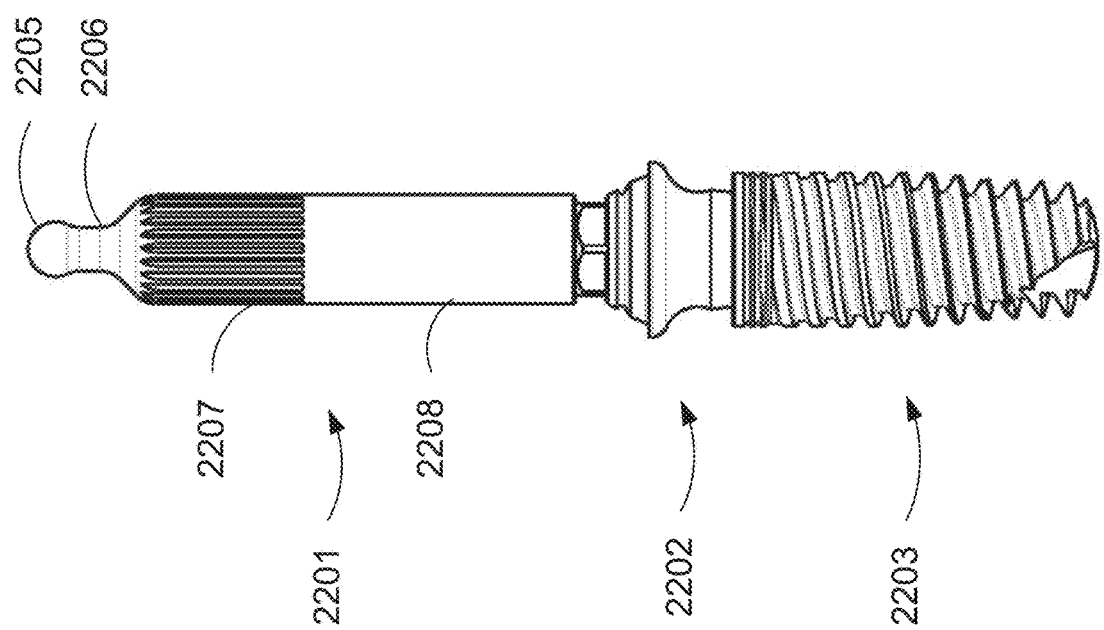
Figure 23A:
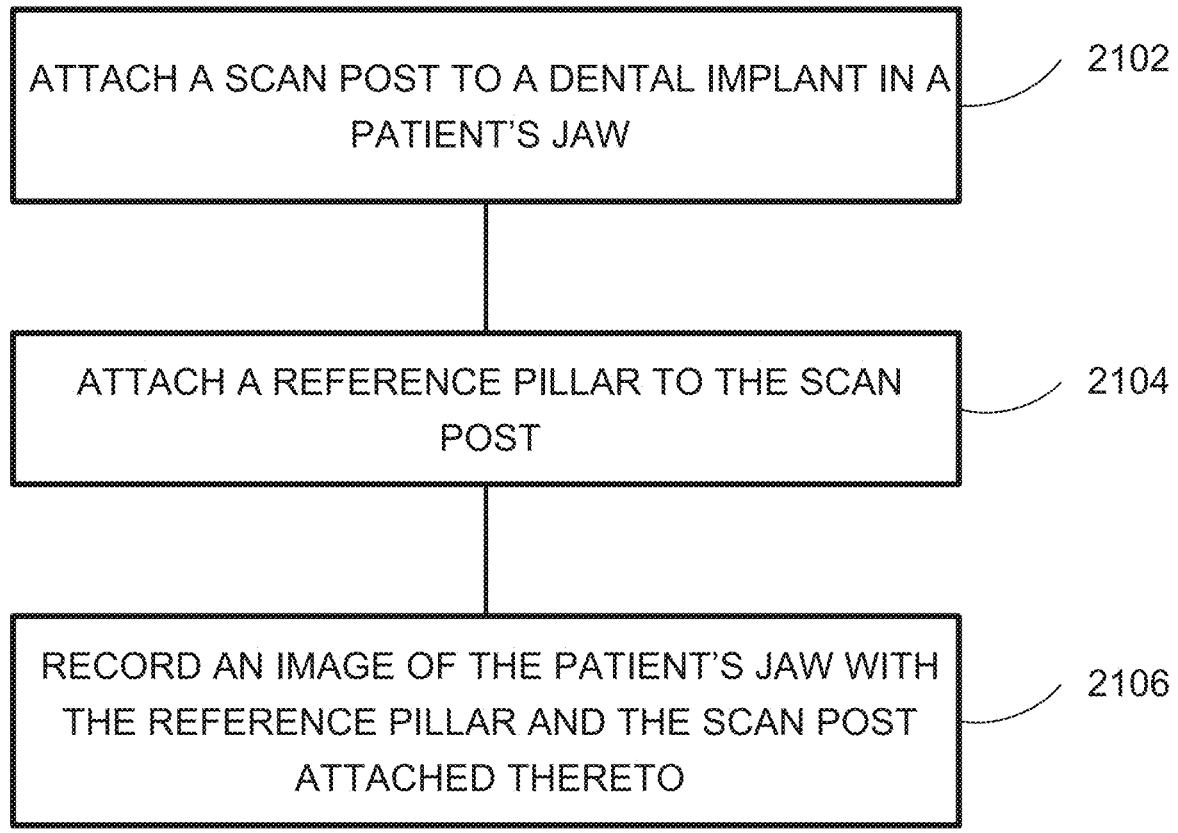
Figure 23B:
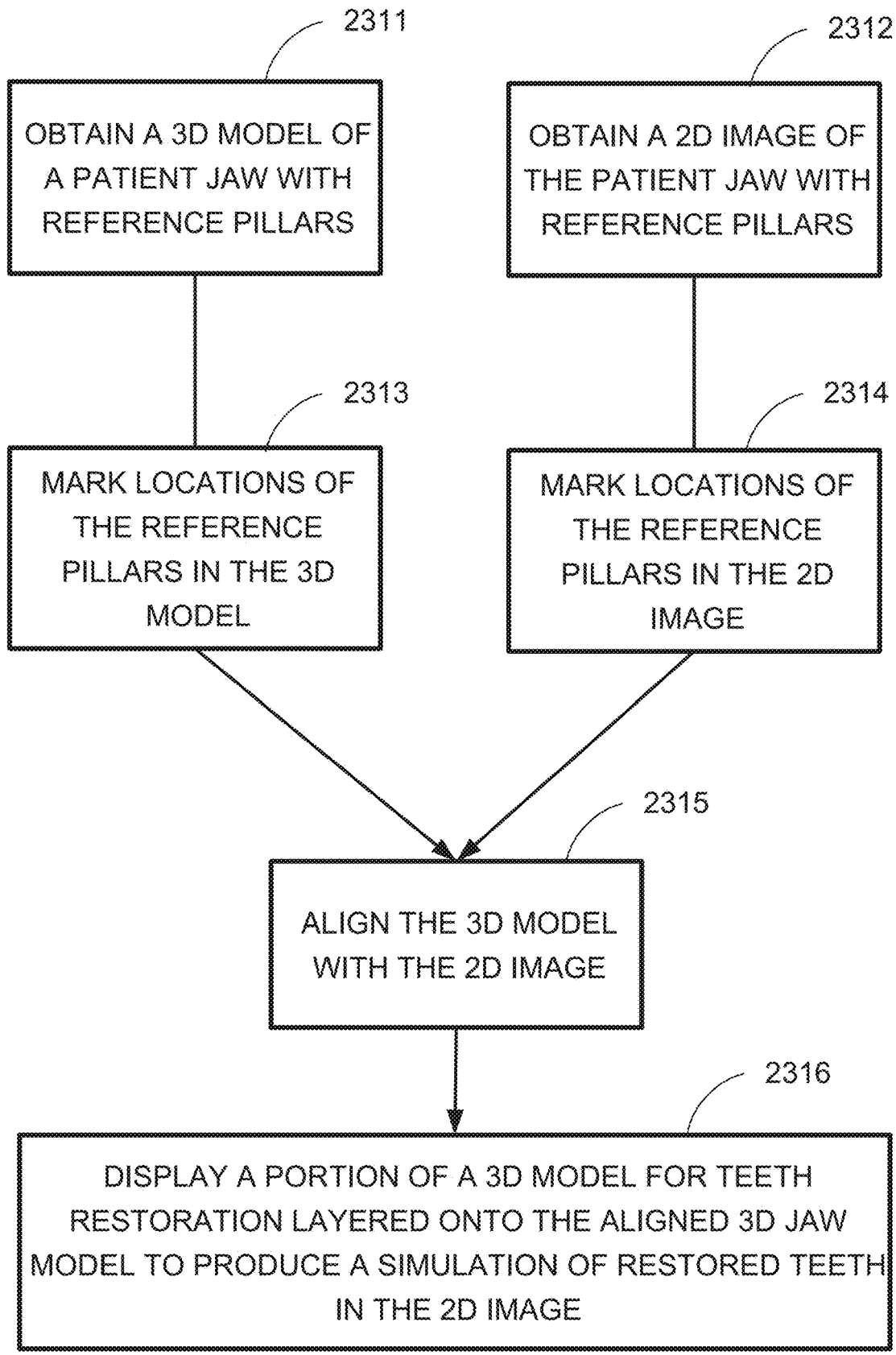

FIG. 1A schematically depicts, in a cross-sectional view, an example embodiment of a bite registration device comprising a scan post and a bite pillar according to an aspect of the invention, connected to an implant by a screw;

FIG. 1B depicts, in a cross-sectional view, the bite registration device of FIG. 1A, wherein the bite pillar is screwed all the way into the scan post;

FIG. 1C schematically depicts the bite registration device of FIG. 1A in a perspective view;

FIG. 1D schematically depicts various example embodiments of the bite pillar of FIG. 1A, some of which with various bite platforms;

FIG. 2 illustrates schematically a flowchart of a method for using bite pillars according to an example embodiment of the invention;

FIG. 3A shows a simplified line drawing illustration of a 3D model with a teeth replica on the bottom jaw and with six implants and related scan posts connected to the implants, in a teeth-less upper jaw according to an example embodiment of the invention;

FIG. 3B shows a simplified line drawing illustration of the model of FIG. 3A with two bite pillars connected to two of the scan posts on the right hand side and the left hand side of the upper jaw according to an example embodiment of the invention;

FIG. 3C is an extra-oral image of a patient who has scan posts and a bite pillar attached thereto according to an example embodiment of the invention;

FIG. 3D is an image of a three-dimensional computer model with two bite pillars connected to two scan posts, one on an upper jaw and one on a lower jaw, according to an example embodiment of the invention;

FIG. 3E is an image of a physical three-dimensional model with four bite pillars connected to four scan posts, two each on an upper jaw and a lower jaw according to an example embodiment of the invention;

FIG. 3F is an image of a physical three-dimensional model with five bite pillars connected to five scan posts, three on an upper jaw and two on a lower jaw according to an example embodiment of the invention;

FIG. 4A schematically depicts, in a cross-sectional view, a bite registration device connected to a straight abutment, the abutment connected to an implant, wherein the bite pillar is screwed only a short way into the scan post, according to an example embodiment of the invention;

FIG. 4B depicts, in a cross-sectional view, the bite registration device of FIG. 4A wherein the bite pillar is screwed all the way into the scan post;

FIG. 4C schematically depicts the bite registration device of FIG. 4A, connected to a straight abutment and an implant in a perspective view;

FIG. 5A schematically depicts, in a cross-sectional view, a bite registration device connected to an angulated abutment, the abutment connected to an implant, wherein the bite pillar is screwed only a short way into the scan post, according to an example embodiment of the invention;

FIG. 5B depicts, in a cross-sectional view, the bite registration device of FIG. 5A wherein the bite pillar is screwed all the way into the scan post;

FIG. 5C schematically depicts the bite registration device of FIG. 5A, connected to an angulated abutment and an implant in a perspective view;

FIG. 6A schematically depicts in a front view an embodiment of an esthetic device according to an example embodiment of the invention, configured to enable registration of Mid-Line (ML), a Low-Lip line (LL) and a High-Lip line (HL) in a digital scan of the mouth;

FIG. 6B schematically depicts in a side view the esthetic device of FIG. 6A;

FIG. 6C schematically depicts in a perspective view the esthetic device of FIG. 6A;

FIG. 7 depicts schematically a virtual tooth setup of 6 frontal upper teeth, with marks indicating the LL (lower lip line), HL (high lip line) and ML (midline) according to an example embodiment of the invention;

FIG. 8 illustrates schematically a flowchart of a method for using an esthetic device according to an example embodiment of the invention;

FIG. 9A depicts schematically a front view of a patient's mouth with six scan posts connected to six implants in the maxilla and two bite pillars connected to two of the scan posts, and the esthetic device is placed in front of the maxilla for recording esthetic parameters according to an example embodiment of the invention;

FIG. 9B depicts schematically a front view of a patient's mouth with six scan posts connected to six implants in the maxilla and two bite pillars connected to two of the scan posts, for recording a digital bite registration according to an example embodiment of the invention;

FIGS. 10A and 10B are simplified line drawing illustrations of a scan post according to an example embodiment of the invention;

FIGS. 11A, 11B and 11C are simplified line drawing illustrations of a scan post according to an example embodiment of the invention;

FIGS. 12A, 12B and 12C are simplified line drawing illustrations of a scan post according to an example embodiment of the invention;

FIGS. 13A, 13B and 13C are simplified line drawing illustrations of a bite pillar adapter on a scan post according to an example embodiment of the invention;

FIGS. 14A, 14B and 14C are simplified line drawing illustrations of a bite pillar on a scan post according to an example embodiment of the invention;

FIG. 15 is a simplified flow chart illustration of a method for mouth model registration according to an example embodiment of the invention;

FIG. 16 is a clinical image of a patient who has scan posts and reference pillars attached thereto according to an example embodiment of the invention;

FIGS. 17A, 17B and 17C are simplified line drawing illustrations of a reference pillar according to an example embodiment of the invention;

FIGS. 18A and 18B are simplified line drawing illustrations of a reference pillar on a scan post according to an example embodiment of the invention;

FIGS. 19A, 19B and 19C are simplified line drawing illustrations of a reference pillar according to an example embodiment of the invention;

FIGS. 20A and 20B are simplified line drawing illustrations of a reference pillar on a scan post according to an example embodiment of the invention;

FIGS. 21A and 21B are simplified line drawing illustrations of a reference pillar in a dental implant according to an example embodiment of the invention;

FIGS. 22A and 22B are simplified line drawing illustrations of a reference pillar in an abutment according to an example embodiment of the invention;

FIG. 23A is a simplified flow chart illustration of a method of mouth model registration using a reference pillar according to an example embodiment of the invention; and FIG. 23B is a simplified flow chart illustration of a method of producing a simulation of restored teeth using a reference pillar according to an example embodiment of the invention.

DESCRIPTION OF SPECIFIC EMBODIMENTS OF THE INVENTION

The invention, in some embodiments, relates to the field of dental implants and more particularly, but not exclusively, to recording methods of dental implant positions, bite registration, smile simulation and esthetic parameters.

Overview

An example technique for registering an implant position in a patient's mouth optionally includes: fixing a scan post or scan posts to an implant in the patient's jaw; scanning the patient's jaw or jaws with an oral scanner; and obtaining digital data to transfer implant information, including position(s) of a scan post and/or the dental implant relative to other objects in the patient's mouth.

The digital data is used to produce a three dimensional model of the patient's mouth, whether a physical model or a virtual, computer model.

One or more scan posts are optionally inserted into the dental implant(s), and protrude above the patient's jaw. The scan post is visible to the oral scanner, and an oral scan which is performed when the scan post(s) are in the jaw produces digital data which includes locations of the scan posts. The digital data now enables locating the dental implants in which the scan posts are inserted, since the scan posts can be visible, and potentially also recognizable by dental software and/or image processing software.

In some embodiments, one or more scan posts are optionally inserted into an abutment, which is attached to the dental implant(s).

A desired property of a three-dimensional model of the mouth is showing both upper and lower jaw in correct alignment to each other, optionally showing a closed mouth closed in a correct and/or repeatable and/or centric bite closure.

An oral scan of a jaw by an intra-oral scanner is typically done with the mouth open, lacking an indication of a correct bite position. While a correct bit position may be deducted from positioning upper and lower jaw models together, if a person is lacks teeth in one or both jaws, it may be impossible to reconstruct a correct bite position by simply positioning the upper and lower jaws together.

One method of obtaining a three-dimensional model of the mouth showing both upper and lower jaw in correct alignment to each other is by capturing an image of the patient's jaws or face with the jaws in correct alignment to each other, optionally an image of a mouth closed in a correct bite position. The image is optionally used as input to align a three-dimensional model of the upper jaw to a three-dimensional model of the lower jaw, optionally based on identified shared locations in the models.

In some cases the alignment is optionally performed automatically by a computer aligning the models of the upper and lower jaws to match the bite registration image. By way of a non-limiting example, the alignment may be performed by a best-fit alignment of the models of the upper and lower jaws to the bite registration scan or model.

A problem which can arise, especially when the patient's jaw is missing several adjacent teeth, or is edentulous (lacking teeth), is that correct alignment of the jaws, and especially a mouth closed in a correct bite closure, is not achievable. The patient cannot close a tooth upon a non-existent tooth.

An aspect of some embodiments of the invention relates to adding a bite pillar to a scan post, adjusted to protrude from the patient's scan post to a correct desired distance, the scan post plus the bite pillar replacing a function of a natural tooth when taking a bite registration, modeling a height of a tooth protruding from a jaw.

In some embodiments, a patient may have a tooth in one jaw opposite a missing tooth in another jaw. The patient can close his/her mouth, and a dentist can adjust the distance which the bite pillar protrudes from the scan post in a location of the missing tooth to set a correct bite closure for the patient.

In some embodiments, the dentist can use articulating paper to determine that the bite pillar correctly contacts an opposite tooth. Articulating paper is a diagnostic tool used in dentistry to highlight occlusal contacts and disturbance in occlusal planes. The articulating paper marks those points on the teeth where the teeth contact when the jaws are closed.

In some embodiments the bite pillar includes a wide coronal portion designed as a mostly flat surface and an apical elongate portion. The apical elongate portion is designed for attaching the bite pillar to a scan post, or a dental implant, or a dental implant analog or a dental abutment. The coronal portion is designed to have a coronal surface suitable for an antagonistic (opposite jaw) tooth or antagonistic bite pillar to contact, enabling a dentist to adjust protrusion of the coronal surface of the bite pillar to produce correct bite position. An area of the coronal surface is optional shaped and sized to be big enough to meet an opposing tooth or bite pillar.

In some embodiments a diameter of the wide coronal portion of the bite pillar is approximately as wide as a widest diameter of a coronal end of a tooth. In some embodiments, approximately as wide as a widest diameter of a coronal end of a tooth the bite pillar is intended to represent, that is, as wide as a tooth which was or would have been in the location where the bite pillar is located.

In some embodiments the wide coronal portion of the bite pillar is approximately circularly shaped, with a diameter in a range of 3 millimeters to 5 millimeters, 10 millimeters, and 20 millimeters.

In some embodiments a diameter of the wide coronal portion of the bite pillar is wider than the apical elongate portion.

In some embodiments the bite pillar is optionally connected to the scan post by an adjustable screw, as is shown in various drawings herein. In some embodiments the bite pillar is optionally connected to the scan post by a sliding mechanism.

In some embodiments, once a correct bite closure distance is adjusted on the bite pillar, movement of the bite pillar is locked to prevent further changes in relative jaw location.

In some embodiments the bite pillar is screwed to the scan post by a fine screw thread, which does not slip under pressure from above on the bite pillar.

In some embodiments the bite pillar is locked to the scan post by a locking pin or screw through a side hole in the bite pillar and/or the scan post.

An aspect of some embodiments of the invention relates to software that takes a scan of the upper and lower jaws in bite position, and recognizes in the scan the place of an upper jaw and the place of a lower jaw, and produces a 3D model of the jaws with the upper and lower jaw correctly aligned, optionally in real time, i.e. during the scanning.

In some embodiments the software uses an additional 2D image to perform the alignment.

In some embodiments the software includes an ability to automatically recognize a bite pillar and/or a reference pillar by their shape.

In some embodiments an open mouth oral scan of a desired jaw is performed, with scan posts in place. In some embodiments an additional scan such as a soft tissue scan may optionally be made, for example for designing a custom made abutment, and/or for recording a pre-operative condition such as existing teeth in the jaw for copying their shape.

Optionally, an open mouth oral scan of an antagonistic (opposite) jaw is optionally performed.

Optionally, a scan from a buccal side (outside) of the mouth, optionally in a correct bite position, is performed. In some embodiments, the software detects shared locations in the buccal scan and the open mouth oral scans. In some embodiments the detection is automatic. In some embodiments the detection is real-time, that is, just as soon as the scans are made. In some embodiments the detection is performed by the software based on an operator's marking the shared locations.

Optionally, the software aligns the open mouth oral scans based on the buccal scan, providing a perfectly aligned model including both jaws.

In some embodiments, a patient may have a missing tooth in one jaw opposite a missing tooth in another jaw. The dentist optionally uses bite pillars on scan posts on both jaws, in order to set a correct bite closure. The patient optionally closes his/her mouth, and the dentist optionally adjust the distance which both the bite pillars protrude from both the scan posts to set a correct bite closure for the patient.

A 3D extra-oral image of the patient's jaws or face with the jaws in correct alignment to each other, optionally with the mouth closed in a correct bite closure, optionally, but not necessarily including a view of the scan posts and/or bite pillars, is optionally used as input to align a three-dimensional model of the upper jaw to a three-dimensional model of the lower jaw.

An aspect of some embodiments of the invention includes adding one or more extension(s), termed herein a reference pillar, to one or more scan post(s), to be captured in an extra-oral two-dimensional (2D) and/or three-dimensional (3D) image.

In some embodiments, the reference pillar is made to protrude from the patient's scan post(s) far enough to also protrude from the patient's lips.

In some embodiments, the patient's jaw or jaws are scanned with an oral scanner and with the reference pillar(s) in place.

The digital data is optionally used to produce a three dimensional model of the patient's mouth, whether a physical model or a virtual, computer model, including scan post(s) and reference pillar(s).

An extra-oral image of the patient's jaws or face showing a smile or a lip rest position, and including a view of the reference pillar(s), is optionally used as input to align a three-dimensional model of a jaw having the reference pillars to the extra-oral image. The extra-oral image may be a 2D image or a 3D image of the patient, smiling or not smiling, and including at least a portion of the reference pillars.

In some embodiments the aligned three-dimensional model is optionally displayed with an overlay of teeth which will optionally be added in a process of teeth restoration, optionally displaying a mouth or a smile with restored teeth, optionally taking into account esthetic parameters from the extra oral image. Non-limiting examples of esthetic parameters include enabling an operator to adjust proportions between teeth size and location to other facial organs, for example aligning patient canine teeth location to patient nose margins.

In some embodiments, the reference pillar includes an identifiable feature, located on the reference pillar so as to appear in an extra-oral image of a patient's mouth, optionally even if the mouth is closed or almost closed. The identifiable feature is preferably identifiable in both a three dimensional model of the patient's mouth and in the extra-oral image, to serve to align the three dimensional model of patient jaws, upper jaw and lower jaw, to a desired position of the patient' mouth in the extra-oral image.

In some embodiments, the identifiable feature is an identifiable shape on a coronal end of the reference pillar. In some embodiments, the identifiable shape is relatively small, so that aligning the shape in the three-dimensional model and in the extra-oral image is accurate.

In some embodiments, the identifiable feature is a sphere-shaped coronal end to the reference pillar. In some embodiments, the sphere-shaped coronal end is relatively small, so that aligning the sphere in the three-dimensional model and in the extra-oral image is accurate.

In some embodiments Digital Smile Design (DSD) software or software module is used to perform matching of upper and lower jaw models based on teeth objects/scan posts/reference pillars which exist in both a 2D image and a 3D, optionally pre-operative, scan.

In some embodiments, Digital Smile Design (DSD) is done by super-imposing image layers—an image of the patient mouth or face with a restoration image, aligned based on common objects in the image layers.

In some embodiments, especially in edentulous cases, reference pillars are attached to scan posts or abutments or dental implants, and the reference pillars show up in both 2D images and 3D scans, to align the upper and lower jaw scans in cases where teeth are not available for the aligning.

In some embodiments a pre-operative scan is optionally used to assist in restoration design, as an additional layer of a 3D model.

In some embodiments a pre-operative scan of an edentulous case is optionally performed including reference pillars.

In some embodiments, when an old restoration is available, a layer of the 3D model may optionally be used to display the old restoration.

An aspect of some embodiments of the invention relates to any one or more of the above-mentioned scan post, bite pillar and reference pillar are optionally made, in part or completely, of a material which is detectable by an oral scanner. By way of a non-limiting example, when the scanner is an optical scanner, or a laser scanner, or a confocal scanner, the material is a material which shows up well in a scan image, such as a non-shiny material or a material having a color contrasting with a mouth.

An aspect of some embodiments of the invention relates to a kit including a scan post and a corresponding bite pillar, optionally paired in a sense of both having a suitable size and attaching dimensions. By way of a non-limiting example a large scan post with a large bite pillar. By way of a non-limiting example a scan post having an screw portion with a correct diameter and thread to fit into a threaded hole in the bite pillar.

An aspect of some embodiments of the invention relates to a kit including a scan post and a corresponding reference pillar, optionally paired in a sense of both having a suitable size and attaching dimensions. By way of a non-limiting example a large-size scan post with a large-size reference pillar. By way of a non-limiting example a reference pillar having a screw portion with a correct diameter and thread to fit into a threaded hole in the scan post.

An aspect of some embodiments of the invention relates to a bite pillar designed with a wide flat coronal end and an elongate apical portion configured to attach to an object in a mouth of a patient.

An aspect of some embodiments of the invention relates to a reference pillar designed with a spherical shaped coronal end and an elongate apical portion configured to attach to an object in a mouth of a patient.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The principles, uses and implementations of the teachings herein may be better understood with reference to the accompanying description and figures. Upon perusal of the description and figures present herein, one skilled in the art is able to implement the teachings herein without undue effort or experimentation. In the figures, like reference numerals refer to like parts throughout.

Reference is now made to FIGS. 1A-1C, of which FIG. 1A schematically depicts, in a cross-sectional view, an example embodiment of a bite registration device comprising a scan post and a bite pillar according to an aspect of the invention, connected to an implant by a screw; FIG. 1B depicts, in a cross-sectional view, the bite registration device of FIG. 1A, wherein the bite pillar is screwed all the way into the scan post; and FIG. 1C schematically depicts the bite registration device of FIG. 1A in a perspective view.

FIGS. 1A-1C schematically depict an embodiment of a bite registration device 100 according to an aspect of the invention, connected to an implant 200 by a screw 202. Bite registration device 100 comprises a scan post 110 and a bite pillar 120 configured to optionally connect to scan post 110, optionally by screwing.

FIG. 1A schematically depicts, in a cross-sectional view, bite registration device 100 within implant 200, wherein bite pillar 120 is optionally screwed only a short way into scan post 110.

FIG. 1B depicts, in a cross-sectional view, bite registration device 100 within implant 200 wherein bite pillar 120 is screwed all the way into scan post 110.

FIG. 1C schematically depicts bite registration device 100 and implant 200 in a perspective view.

Scan post 110 is optionally made of metal and/or a polymer material, possibly titanium, possibly titanium grade 5. Scan post 110 has a body 130 extending along a longitudinal axis 132 of the scan post, between an apical end 136 and a coronal end 138. Body 130 optionally includes, adjacent to apical end 136 a connection interface portion 140, for potentially connecting to a dental implant or dental implant replica as is further detailed herein below. Body 130 optionally further includes, adjacent to coronal end 138 a conical portion 150, optionally pointing towards connection interface portion 140. An optionally cylindrical portion 152 of body 130 extends between connection interface portion 140 and conical portion 150. By conical portion 150 being pointing towards connection interface portion 140 it is meant that conical portion 150 has its narrow base closer to connection interface portion 140, whereas its wide base is further away from connection interface portion 140.

In body 130, the narrow base of optional conical portion 140 adjoins cylindrical portion 152, whereas the wide base of conical portion 140 optionally coincides with coronal end 138 of body 130. Conical portion 150 is optionally sectioned by one, two three or even more planar cone sections proximal coronal end 138. FIGS. 1A-C show a parallel cone section 154 extending parallel to longitudinal axis 132. Tilted cone sections 156 (shown in FIG. 1C) are optionally arranged symmetrically on both sides of parallel cone section 154 and are optionally tilted relative to longitudinal axis 132. It is noted that cone sections 154 and 156 potentially render scan post 110 a relatively narrow body, allowing to fit scan post 110 even between two teeth of a patient, thereby enhancing usage options of the scan post by a physician.

According to some embodiments a scanning code 158, optionally used to identify the scan post or the patient or provide any suitable identification, may be written, engraved or added onto the scan post, e.g. on the conical section 156 or on one of the cone sections thereof.

Body 130 optionally comprises a through-hole 160, optionally extending along longitudinal axis 132 between apical end 136 and coronal end 138, to optionally accommodate a bolt such as a rivet or screw 202 for optionally connecting the scan post 110 to an implant, abutment or an implant analog (implant replica). Body 130 further optionally comprises an internal shoulder 162 in through-hole 160, facing coronal end 138, so that through-hole 160 is wider above internal shoulder 162 (that is to say, closer to coronal end 138) than below internal shoulder 162. Internal shoulder 162 is optionally configured to support a bolt such as a rivet or screw 202 disposed in the through hole 160 from above, namely through the coronal end 138, when the screw 202 connects the scan post 110 to the implant 200.

In some embodiments through hole 160 is optionally threaded at least along a portion thereof, optionally above internal shoulder 162, by an internal thread 164 configured to receive therein a screw by screwing. Thread 164 optionally extends along a section of through hole 160 between coronal end 138 and internal shoulder 162, thereby rendering scan post 110 configured to optionally receive therein a screw such as a screw on bite pillar 120, by screwing.

In some embodiments bite pillar 120 has a generally elongated cylindrical shape, extending between a pillar apical end 166 and a pillar coronal end 168 thereof and possibly having a wide head on the coronal end thereof.

In some embodiments bite pillar 120 optionally comprises a threaded screw 170 near pillar apical end 166 optionally toward an apical portion of the bite pillar 120. Threaded screw 170 is configured to fit to thread 164 in through hole 160, to allow screwing bite pillar 120 into scan post 110.

According to some embodiments a bite pillar of the invention may tunably connect to a scan post of the invention using a connection mechanism other than screwing. For example, an embodiment of a bite registration device of the invention may comprise a scan post having a smooth through hole without a threaded portion, and a bite pillar having no threaded portion near the apical end thereof.

According to some embodiments, an apical portion of the bite pillar may have a diameter dimensioned and configured to enable insertion of the bite pillar into the through hole of the scan post and to allow supporting the bite pillar in the through hole by friction between through-hole's wall and the bite pillar.

According to some embodiments, a lock mechanism such as a securing screw may be provided in the scan post, aligned through and perpendicular to the longitudinal axis of the scan post, to enable locking the bite pillar in place.

In some embodiments bite pillar 120 optionally includes a pillar head 172 above threaded screw 170 and proximal to pillar coronal end 168. Pillar head 172 is optionally wider than threaded screw 170, namely has a larger diameter. According to some embodiments pillar head 172 is slotted or knurled along a rim 174 thereof by slots 176, to allow convenient gripping and revolving the bite pillar by hand by a practitioner such as a dentist. According to some embodiments, head 172 further comprises a bite platform 180, optionally depressed from pillar coronal end 168 for containing a mold material as is further detailed and explained below.

Reference is now made to FIG. 1D, which schematically depicts various example embodiments of the bite pillar of FIG. 1A, some of which with various bite platforms.

FIG. 1D schematically depicts various embodiments of bite pillars 120A-120D (collectively bite pillar 120).

Bite pillars 120C and 120D comprise bite platform 180.

Bite pillars 120 may be made of a polymer material, optionally of a hard thermoplastic polymer, for example Polyether ether ketone (PEEK) or Polyoxymethylene (POM/acetal).

A medical practitioner provided with bite pillar 120 at a single length, might be limited in establishing the gap between the two jaws to only a small range which is dictated by the length along which the bite pillar may enter into the scan post. According to some embodiments of the invention, embodiments of bite pillar 120 may be manufactured and/or supplied at two or more different lengths, to allow the medical practitioner select and establish a required gap between the two jaws of the patient, within a large range of gaps.

Reference is now made to FIG. 2, which illustrates schematically a flowchart of a method for using bite pillars according to an example embodiment of the invention.

(a) In a step 210, scan post 110 is connected to the implant 200, optionally using screw 202 (the implant already being installed in the patient's mouth). It is noted that different scan posts (e.g. having different lengths, diameters, etc.) may be selected to be used in different clinical situations. In other words, scan post 110 optionally covers a range of different scan posts which are preferably used in different situations. If required, a multitude of scan posts are connected to respective implants in the mouth, to include the position of all the implants in a single model.

(b) In a step 220, one or more bite pillars are connected to the scan posts, optionally by screwing the bite screws to respective scan posts. If only one implant is currently installed in the mouth and ready to accept a bite pillar, then a single bite pillar is used with the scan post. If several scan posts are currently installed, then several bite pillars may be used. In some embodiments two bite pillars are used, if possible, on different sides of the mouth, to obtain a balanced bite registration.

Reference is now additionally made to FIGS. 3A and 3B, of which FIG. 3A shows a simplified line drawing illustration of a 3D model with a teeth replica on the bottom jaw and with six implants and related scan posts connected to the implants, in a teeth-less upper jaw according to an example embodiment of the invention, and FIG. 3B shows a simplified line drawing illustration of the model of FIG. 3A with two bite pillars connected to two of the scan posts on the right hand side and the left hand side of the upper jaw according to an example embodiment of the invention.

FIGS. 3A and 3B demonstrate a simulation of the use of a bite registration device using a 3D model of a mouth. FIG. 3A shows an illustration of a 3D model 300 with a teeth replica 302 on the bottom jaw and with six implants and related scan posts 310 connected to the implants, in a tooth-less upper jaw.

FIG. 3B shows an illustration of model 300 with two bite pillars 320 connected to two of the scan posts on the right hand side and the left hand side of the upper jaw.

An example digital bite registration or digital bite-scan with bite registration device 100 is optionally performed, to relate the implant position to the opposite jaw. To register the positon of the opposite jaw and the teeth thereon, the height of the bite platform is optionally adjusted.

Thus, in a step 230 (c) of the method of FIG. 2, bite pillars 320 may be screwed iteratively in and out of their respective scan posts, until the height of the bite-registration is satisfactory to a physician, and/or until the bite platform of the bite pillar is in contact with the teeth in the opposite jaw, in a correct bite height which is potentially a comfortable bite position of the patient, in a centric relation position.

According to some embodiments it may be desired to check the bite registration prior to the registration with the intra/extra oral scanner. For this end, the patient may bite several times on a bite platform in a centric relation. In some embodiments, if the patient is able to repeat the centric relation position on the bite platform, the setting of the bite pillar(s) is considered ready for registration (e.g. intra-oral scan).

In some embodiments, the opposite jaw can be registered when the patient maintains an occluded mouth in a steady state position on the bite platform. Scanning of habitual intercuspation is potentially possible when a position of the implant is located straight in the line of the occlusion with the opposite jaw or opposite tooth. In comparison to an old method using a wax rim, the patient's proprioception will potentially not change, because of a minor volume of the new device, during bite registration.

According to some embodiments, a setting of the bite pillar and a resulting bite height may optionally be used for measuring occlusal surfaces of a temporary or a definitive restoration on the implant. According to some embodiments, the setting of the bite pillar and the resulting bite height may be used for measuring the occlusal surfaces on a prosthesis placed on the implant or implant abutment. According to some embodiments, the setting of the bite pillar and the resulting bite height may be used for measuring the relationship and occlusal surfaces with the teeth on the opposite jaw.

According to some embodiments, it may be desired to register a perfect Occlusal vertical dimension in an accurate and repetitive way by using bite pillar 120C or 120D of FIG. 1D described above, which include bite platform 180.

According to some embodiments, a flexible a polymer material or resin composite material may be placed in the bite platform and the patient is requested to bite an impression into the material in the bite platform in a centric relation position.

In such embodiments, in a first stage, the flexible material (e.g. the resin composite material) maintains an imprint of the incuspidation of the opposite teeth to reproduce a bite in an accurate manner.

In some embodiments, when the incuspidation is substantiated, e.g. by repeating the patient's occlusion on the adjusted bite platform, the resin composite material can optionally be cured (for example using a dental UV-lamp to cure composite or a direct restorative resin material, as is known in the dental art) to fix the form of the material in the platform.

According to some of the teachings herein, it may be desired, in a course of a dental treatment, to scan and register the position and orientation in the mouth of an abutment, after such an abutment has been connected to an implant. For this end, a bite registration device of the invention may be connected to the abutment (the abutment may be connected to an implant) as is further detailed and explained below, and an intra-oral scan or an extra-oral scan may be performed.

Reference is now made to FIG. 3C, which is an extra-oral image of a patient who has scan posts and a bite pillar attached thereto according to an example embodiment of the invention.

FIGS. 3A and 3B showed the scan posts and a bite pillars in a physical model of a mouth. FIG. 3C show the scan posts and a bite pillars in an actual patient mouth.

FIG. 3C shows an image of a bite registration device 305 which includes a scan post 310 and a bite pillar 320.

FIG. 3C also shows additional scan posts 310 embedded in the patient's upper jaw, the patient's natural teeth 325 in the patient's lower jaw, in context of the patient's lips 326.

FIG. 3C shows a dentist's fingers 327 pulling the lips 326 aside, revealing the patient's teeth.

In some embodiments the dentist optionally adjusts the bite pillar 320 of the bite registration device 305 by screwing in or out of the scan post 310.

Reference is now made to FIG. 3D, which is an image of a three-dimensional computer model with two bite pillars connected to two scan posts, one on an upper jaw and one on a lower jaw, according to an example embodiment of the invention;

FIGS. 3A and 3B showed the scan posts and a bite pillars in a physical model of a mouth. FIG. 3D shows the scan posts and a bite pillars in three-dimensional computer model.

FIG. 3D shows an image of two bite registration devices 305, each of which includes a scan post 310 and a bite pillar 320. The two bite registration devices 305 are each embedded in an opposite jaw and the bite pillars 320 are antagonistic to each other.

In some embodiments a dentist optionally adjusts the bite pillars 320 of each jaw to set a correct bite position for the patient.

FIG. 3D also shows additional scan posts 310 embedded in the patient's jaws.

Reference is now made to FIG. 3E, which is an image of a physical three-dimensional model with four bite pillars connected to four scan posts, two each on an upper jaw and a lower jaw according to an example embodiment of the invention.

FIGS. 3A and 3B showed the scan posts and a bite pillars in a physical model of a mouth. FIG. 3E also shows the scan posts and a bite pillars in a physical model of a mouth of a fully edentulous case, upper and lower jaws missing teeth.

FIG. 3E shows an image of four bite registration devices 305, each of which includes a scan post 310 and a bite pillar 320. The four bite registration devices 305 are embedded in opposite jaws, and the bite pillars 320 are antagonistic to each other.

In some embodiments a dentist optionally adjusts the bite pillars 320 of each jaw to set a correct bite position for the patient.

FIG. 3E also shows an additional scan posts 310 embedded in the patient's jaws.

Reference is now made to FIG. 3F, which is an image of a physical three-dimensional model with five bite pillars connected to five scan posts, three on an upper jaw and two on a lower jaw according to an example embodiment of the invention.

FIG. 3F also shows the scan posts and a bite pillars in a physical model of a mouth.

FIG. 3E shows an image of five bite registration devices 305, each of which includes a scan post 310 and a bite pillar 320. The five bite registration devices 305 are embedded in opposite jaws, and the bite pillars 320 are antagonistic to each other.

FIG. 3E shows a pair of bite registration devices 305 on a right side of the drawing, each of which includes a scan post 310 and a bite pillar 320. The two bite registration devices 305 on the right of the drawing are embedded in opposite jaws, and the bite pillars 320 are antagonistic to each other.

FIG. 3E also shows three bite registration devices 305 on a left side of the drawing, each of which includes a scan post 310 and a bite pillar 320. The three bite registration devices 305 on the left of the drawing are embedded in opposite jaws, and two bite pillars 320 on the upper jaw are antagonistic to one bite pillar 320 on the lower jaw.

In some embodiments a dentist optionally adjusts each one of the bite pillars 320 to set a correct bite position for the patient. In case of two bite pillars 320 opposing one bite pillar 320, the dentist optionally adjusts all three of the bite pillars 320.

FIG. 3E also shows an additional scan posts 310 embedded in the patient's jaws.

Reference is now made to FIGS. 4A-4C, of which FIG. 4A schematically depicts, in a cross-sectional view, a bite registration device connected to a straight abutment, the abutment connected to an implant, wherein the bite pillar is screwed only a short way into the scan post, according to an example embodiment of the invention, FIG. 4B depicts, in a cross-sectional view, the bite registration device of FIG. 4A wherein the bite pillar is screwed all the way into the scan post, and FIG. 4C schematically depicts the bite registration device of FIG. 4A, connected to a straight abutment and an implant in a perspective view.

FIGS. 4A-4C schematically depict an embodiment of a bite registration device 400 according to an aspect of the invention, connected to a straight abutment 460 by a screw 470, straight abutment 460 being connected to implant 200.

Bite registration device 400 includes a scan post 410, optionally made of metal or a polymer material, and a bite pillar 120 configured to connect to scan post 410, optionally by screwing.

FIG. 4A schematically depicts, in a cross-sectional view, bite registration device 400 connected to straight abutment 460 within implant 200, wherein bite pillar 120 is screwed only a short way into scan post 410.

FIG. 4B depicts, in a cross-sectional view, bite registration device 400 connected to straight abutment 460 within implant 200 wherein bite pillar 120 is optionally screwed all the way into scan post 410.

FIG. 4C schematically depicts bite registration device 400, straight abutment 460 and implant 200 in a perspective view.

Scan post 410 comprises a body 430 extending along a longitudinal axis 432 of the scan post 410, between an apical end 436 and coronal end 138. Body 430 optionally comprises conical portion 150 adjacent to coronal end 138 and is in some embodiments, such as shown in FIGS. 4A-4C, optionally different from body 130 of FIGS. 1A-1C in having a connection interface portion 440 adjacent apical end 436. Connection interface portion 440 is configured to connect to an abutment such as straight abutment 460. Connection interface portion 440 optionally has a conical external outline 442 and optionally a conical internal outline 444 defining a conical frustum cavity 446 in body 430, conical frustum cavity 446 being configured and dimensioned to receive therein a conical top portion 462 of straight abutment 460.

According to some embodiments, body 430 may optionally not include a cylindrical portion between connection interface portion 440 and conical portion 150.

In some embodiments body 430 further optionally comprises through-hole 160, extending along longitudinal axis 432 between apical end 436 and coronal end 138, to optionally accommodate a bolt such as a rivet or screw 470 for connecting the scan post to an abutment as described herein.

In some embodiments body 430 optionally comprises internal shoulder 162 in through-hole 160, facing coronal end 138 as described above regarding scan post 110. Internal shoulder 162 is optionally configured to support a bolt such as the rivet or screw 470 disposed in the through hole from above, namely through the coronal end 138, when the screw connects the scan post to the straight abutment 460.

In some embodiments through hole 160 is threaded at least along a portion thereof above internal shoulder 162 by internal thread 164 configured to receive therein a screw by screwing. Thread 164 extends along a section of through hole 160, optionally between coronal end 138 and internal shoulder 162, thereby rendering scan post 410 configured to receive therein a screw such as bite pillar 120 by screwing.

According to some embodiments a bite registration device may be connected to an angulated abutment rather than a straight abutment.

Reference is now made to FIGS. 5A-5C, of which FIG. 5A schematically depicts, in a cross-sectional view, a bite registration device connected to an angulated abutment, the abutment connected to an implant, wherein the bite pillar is screwed only a short way into the scan post, according to an example embodiment of the invention, FIG. 5B depicts, in a cross-sectional view, the bite registration device of FIG. 5A wherein the bite pillar is screwed all the way into the scan post, and FIG. 5C schematically depicts the bite registration device of FIG. 5A, connected to an angulated abutment and an implant in a perspective view.

FIGS. 5A-5C schematically depict bite registration device 400 connected to an angulated abutment 480, wherein angulated abutment 480 is connected to implant 200.

FIG. 5A schematically depicts, in a cross-sectional view, bite registration device 400 connected to angulated abutment 480 within implant 200, wherein bite pillar 120 is screwed only a short way into scan post 410.

FIG. 5B depicts, in a cross-sectional view, bite registration device 400 connected to angulated abutment 480 within implant 200 wherein bite pillar 120 is screwed all the way into scan post 410.

FIG. 5C schematically depicts bite registration device 400, angulated abutment 480 and implant 200 in a perspective view.

Numbered references in FIGS. 5A-5C which are similar to numbered references in FIGS. 4A-4C depict similar components of the bite registration device 400, and are similarly described.

Reference is now made to FIGS. 6A-6C and 7, of which FIG. 6A schematically depicts in a front view an embodiment of an esthetic device according to an example embodiment of the invention, configured to enable registration of Mid-Line (ML), a Low-Lip line (LL) and a High-Lip line (HL) in a digital scan of the mouth, FIG. 6B schematically depicts in a side view the esthetic device of FIG. 6A, FIG. 6C schematically depicts in a perspective view the esthetic device of FIG. 6A, and FIG. 7 depicts schematically a virtual tooth setup of 6 frontal upper teeth, with marks indicating the LL (lower lip line), HL (high lip line) and ML (midline) according to an example embodiment of the invention.

FIG. 6A depicts an embodiment of an aesthetic device 600 according to an aspect of the invention, configured to enable registration of an incisive papilla, a mid-line (ML), a Low-Lip line (LL) and a High-Lip line (HL) in a digital scan of the mouth (e.g. a point 646 on midline 644 of FIG. 7 (the cross point between the midline and the incisal line of the two central incisors, about 1 mm below LL 640, and even further below HL 642.

In some embodiments esthetic device 600 comprises a ruler 602 extending between a ruler top end 604 and a ruler bottom end (not shown in these Figures). Esthetic device 600 further comprises a top slide ruler 606 and a bottom slide ruler 608, each being configured to slide along ruler 602. According to some embodiments slide rulers 606 and 608 may further comprise scan-detectable marks 616 and 618, respectively, for indicating the HL and LL respectively. Esthetic device 600 may further comprise (possibly on one or both of slide rulers 606 and 608) a mid-line mark 620, positioned along a left-right symmetry axis 622 of ruler 602 and configured to indicate a position of the ML 644 of FIG. 7.

In some embodiments esthetic device 600 may further comprise (possibly on bottom slide ruler 608) an A-point mark 624, positioned on midline 644, optionally 1 mm below LL 640. The marks 616, 618, 620 and 624 are optionally configured to be detectable in a digital scan of the mouth.

In some embodiments esthetic device 600 further comprises an incisive papilla rest 626 positioned near ruler top end 604, substantially perpendicular to ruler 602, and optionally configured to rest against incisive papilla of the patient when the esthetic device is used as described below.

In some embodiments esthetic device 600 further comprises a limiter 610, configured to lock onto ruler 602 on a bottom portion thereof, using a knob 612, for limiting a displacement of the slide rulers, and particularly of bottom slide ruler 608.

In some embodiments esthetic device 600 may be used to enable registration of the mid-line, the Low-Lip line and the High-Lip line in a digital scan of the mouth, thereby providing a digital computerized file comprising results of a digital scan, wherein the mid-line of the mouth, the LL and HL marks are indicated directly in their respective 3D positions with respect to other objects (such as teeth or scan posts) in the mouth.

Reference is now made to FIG. 8, which illustrates schematically a flowchart of a method for using an esthetic device according to an example embodiment of the invention.

For use, a practitioner may employ a method as is schematically illustrated in FIG. 8:

(1) In a step 710, a marker may optionally be used to indicate the facial midline of the patient, e.g. by marking a dot on the patient's lip.

(2) In a step 720 esthetic device 600 is optionally placed on the patient's central incisive papilla, e.g. in the upper jaw. The esthetic device is optionally held along the central line of the face (as optionally marked by the midline mark).

(3) In a step 730 the patient is optionally asked to maintain the lips in a rest (neutral) position, and the practitioner optionally indicates the LL on the esthetic device by sliding the bottom slide ruler 608 to the lip-line.

(4) In a step 740 the patient is optionally requested to smile, and the practitioner optionally indicates the HL on the esthetic device by sliding the top slide ruler 606 to the lip-line.

(5) In a step 750 the positions of the slide rulers and the position of the mid line are optionally marked on ruler 602, e.g. by marks 616 and 618. According to some embodiments a thin elongated portion of ruler 602, extending along a centerline thereof, may be made of a detectable material under scan. According to some embodiments, slide rulers 606 and 608 may likewise be made from a material particularly detectable under scan (such as PEEK), thereby optionally rendering the marking described in step (750) unnecessary.

(6) In a step 760, optionally before scanning, the patient may optionally be requested to use a cheek retractor.

(7) In a step 770 esthetic device 600 is optionally positioned along the face midline according to the midline mark that was optionally marked in step (1).

(8) In a step 780, a scan may optionally be performed, the scan optionally capturing the mouth objects (such as teeth and scan posts), optionally at least the anterior region of the mouth, optionally together with the lines indicating the LL and the HL on esthetic device 600.

Reference is now made to FIG. 9A, which depicts schematically a front view of a patient's mouth with six scan posts connected to six implants in the maxilla and two bite pillars connected to two of the scan posts, and the esthetic device is placed in front of the maxilla for recording esthetic parameters according to an example embodiment of the invention.

FIG. 9A demonstrates schematically an optional combined use of bite pillars of the invention such as bite pillars 120, together with esthetic device 600. FIG. 9A depicts schematically a front view of a patient's mouth with six scan posts such as scan posts 110, connected to six implants (not shown in the photograph) in the maxilla. Two bite pillars 120 are connected to two of the scan posts 110, optionally on the left hand side and the right hand side of the mouth. Esthetic device 600 is optionally placed in front of the maxilla for recording esthetic parameters.

According to some embodiments, the dentist may use the esthetic device 600, e.g. according to the method (or selected steps thereof) described above in steps (1)-(8) of FIG. 8. In some embodiments the dentist may optionally also manipulate the height of the bite pillars, e.g. according to the method (or selected steps thereof) described above in steps (a)-(c) of FIG. 2. In other words, the dentist may select a desired position (height) of the bite pillars, indicating the maximum intercuspation, while considering both the physical relative positioning of the upper jaw and the lower jaw, and also esthetic parameters associated with the external soft tissues of the face.

Reference is now made to FIG. 9B, which depicts schematically a front view of a patient's mouth with six scan posts connected to six implants in the maxilla and two bite pillars connected to two of the scan posts, for recording a digital bite registration according to an example embodiment of the invention.

FIG. 9B depicts schematically a front view of a patient's mouth with six scan posts 110 connected to six implants in the maxilla and two bite pillars 120 connected to two of the scan posts 110, for recording a digital bite registration.

In some embodiments, when there are multiple implants in the edentulous jaw, some dentists may optionally register the implant positions in one single visit. The scan result on multiple implants without references of the surrounding teeth or other structures depends on the scan-technique and the experience of the practitioner.

In some embodiments, to enhance the validity of a scan result, 2 scans of the same jaw with the multitude of implants can be performed in the same visit by the same practitioner with the same scan technique. Comparing these 2 scans may be employed to verify the quality of the scans. The verification can optionally be done by a superposition technique, optionally by calculating spatial gaps between same objects in the two scans. When the gaps are below a pre-determined accuracy threshold of the intra/extra oral scanner, the scan can optionally be approved. For example, an accuracy level of 35 µm can be determined when using a 3 shape dental scanner of the 3rd generation.

An additional or alternative technique to improve the scan result is the use of a verification jig. The verification jig may be made by the dental lab or the implant manufacturer. The jig may provide a rigid connection between the multiple implants or abutment on a primary scan model and when the jig fits perfectly on all implant positions, the primary implant scan can optionally be approved.

Reference is now made to FIGS. 10A and 10B, which are simplified line drawing illustrations of a scan post according to an example embodiment of the invention.

FIGS. 10A and 10B show a scan post 1010 having an internal hole 1007 with an internal threading 1002 for screwing in a bite pillar (not shown in FIGS. 10A and 10B).

FIG. 10A is an isometric view of the scan post 1010, and FIG. 10B is a cross sectional view of the scan post 1010.

FIGS. 10A and 10B also show a conical portion 1003 of the scan post 1010; a tilted section 1004 of the scan post 1010; a narrow base 1005 of the scan post 1010; and a connection 1006 to implant of the scan post 1010, intended to be placed within a dental implant (not shown in FIGS. 10A and 10B).

Reference is now made to FIGS. 11A, 11B and 11C, which are simplified line drawing illustrations of a scan post according to an example embodiment of the invention.

FIGS. 11A-C show a scan post 1110 having an external thread 1102, for screwing on a bite pillar (not shown in FIGS. 10A and 10B).

FIG. 11A is an isometric view of the scan post 1010, FIG. 11B is a side view of the scan post 1110, and FIG. 11C is a cross sectional view of the scan post 1110.

In some embodiments, the scan post 1110 optionally, but not necessarily, includes an internal hole 1107, optionally centered about a longitudinal axis 1101 of the scan post 1110. In some embodiments, the internal hole 1107 optionally serves to accommodate a screw (not shown) for attaching the scan post 1110 to a dental implant (not shown).

FIGS. 11A-C also show a parallel, optionally cylindrical, portion 1104 of the scan post 1010; a conical portion 1105; and a narrow base 1106 of the scan post 1010; intended to be placed within a dental implant (not shown in FIGS. 10A-C).

FIGS. 11A-C also shows an optional flat facet 1103 on the scan post 1010. In some embodiments the flat facet 1103 optionally serves to assist in identifying a direction of the scan post 1110 in an oral image and/or in a three-dimensional model.

Reference is now made to FIGS. 12A, 12B and 12C, which are simplified line drawing illustrations of a scan post according to an example embodiment of the invention.

FIGS. 12A-C show a scan post 1210 having includes an internal hole 1207, optionally centered about a longitudinal axis 1201 of the scan post 1210. In some embodiments, the internal hole 1207 optionally serves to accommodate a screw (not shown) for attaching the scan post 1210 to a dental implant (not shown).

FIG. 12A is an isometric view of the scan post 1210, FIG. 12B is a side view of the scan post 1210, and FIG. 12C is a cross sectional view of the scan post 1210.

FIGS. 12A-C also show a parallel, optionally cylindrical, portion 1204 of the scan post 1210; a conical portion 1205; and a narrow base 1206 of the scan post 1210; intended to be placed within a dental implant (not shown in FIGS. 12A-C).

FIGS. 12A-C also shows an optional flat facet 1203 on the scan post 1210. In some embodiments the flat facet 1203 optionally serves to assist in identifying a direction of the scan post 1210 in an oral image and/or in a three-dimensional model.

Reference is now made to FIGS. 13A, 13B and 13C, which are simplified line drawing illustrations of a bite pillar adapter on a scan post according to an example embodiment of the invention.

In some embodiments a bite pillar (not shown) is optionally attached to or mounted on a bite pillar adapter 1310, and the bite pillar adapter is attached to or mounted on a scan post 1311.

FIGS. 13A-C show the bite pillar adapter 1310 and the scan post 1311.

FIG. 13A is an isometric view, FIG. 13B is a side view, and FIG. 13C is a cross-sectional view.

In the example embodiment of FIGS. 13A-C, the bite pillar adapter 1310 envelops the scan post 1311. In some embodiments of the invention the bite pillar adapter 1310 optionally has a hole 1302, which optionally press-fits onto an extension 1312 on the scan post 1311. In some embodiments of the invention the bite pillar adapter optionally has a threaded hole, which optionally screws onto an external threading on a screw portion of a bite pillar.

In some embodiments a coronal end of the bite pillar adapter optionally includes a hole 1307, optionally with an internal threading 1309, optionally to attach a bite pillar into the hole 1307.

FIGS. 13A-C also show a parallel, optionally cylindrical, portion 1306 of the scan post 1311; a flat facet 1305 on the scan post 1311; a conical section 1307 of the scan post 1310; and an implant connection 1308, intended to be placed within a dental implant (not shown in FIGS. 13A-C).

Reference is now made to FIGS. 14A, 14B and 14C, which are simplified line drawing illustrations of a bite pillar on a scan post according to an example embodiment of the invention.

FIGS. 14A-C show a bite pillar 1401 and a scan post 1402.

FIG. 14A is an isometric view, FIG. 14B is a side view, and FIG. 14C is a cross-sectional view.

In the example embodiment of FIGS. 14A-C, the bite pillar 1401 includes a screw portion 1404 screwing into a threaded hole in the scan post 1402.

In some embodiments a coronal end 1407 of the bite pillar 1401 is optionally flat.

In some embodiments the coronal end 1407 of the bite pillar 1401 optionally has a greater diameter than the screw portion 1404.

FIGS. 14A-C also show a parallel, optionally cylindrical, portion 1406 of the scan post 1402; a flat facet 1403 on the scan post 1402; a conical section 1407 of the scan post 1402; and an implant connection 1408, intended to be placed within a dental implant (not shown in FIGS. 14A and 14B).

Some of FIGS. 14A-C also show internal threading 1409 in the scan post 1402, and external threading 1405 on the screw portion 1404 of the bite pillar 1401.

Reference is now made to FIG. 15, which is a simplified flow chart illustration of a method for mouth model registration according to an example embodiment of the invention.

The method of FIG. 15 includes:

attaching a scan post to a dental implant in a patient jaw (1502);

attaching a bite pillar to the scan post (1504)

adjusting a distance of a coronal end of the bite pillar to the apical end of the scan post to a desired distance (1506); and scanning the patient's jaw with the bite pillar and the scan post attached thereto (1508).

In some embodiments the attaching the scan post to the dental implant and the attaching the bite pillar to the scan post includes attaching a bite pillar already attached to the scan post to the dental implant.

In some embodiments the scanning is digitally recorded.

In some embodiments an oral scan of both of the patient's jaws is optionally performed with the bite pillar and the scan post attached to the patient's jaw.

In some embodiments the adjusting optionally includes adjusting the bite pillar to achieve correct bite closure when the patient's jaw is closed against the patient's other jaw.

In some embodiments the adjusting optionally includes iteratively adjusting the bite pillar to achieve correct bite closure.

In some embodiments the attaching the bite pillar and the scan post optionally includes attaching more than one bite pillar and corresponding scan posts to more than one dental implant in a patient jaw.

In some embodiments the adjusting the distance includes adjusting distances of coronal ends of the bite pillars to apical ends of corresponding scan posts.

In some embodiments at least one bite pillar and corresponding scan post is attached to a different jaw then at least another bite pillar and corresponding scan post.

In some embodiments one or more bite pillars and corresponding scan post(s) is optionally attached to one jaw opposite another bite pillar and corresponding scan post which is attached to a second jaw.

In some embodiments models of each one of both of the patient's jaws are aligned, based, at least in part, on the image of the patient's jaw.

Reference Pillar(s)

A problem which can arise when a patient is missing several teeth is that an extra-oral image taken with the jaws in correct alignment may not show neighboring teeth in a manner which enables a dentist to plan dental restoration.

An aspect of some embodiments of the invention includes adding one or more extension(s), termed herein a reference pillar, optionally to one or more scan post(s), to be captured in an extra-oral image and in a 3D model made based on an oral scan which also captured the reference pillars.

The reference pillars are made to be visible in the extra-oral image and in an oral scan, and optionally enable matching locations on the reference pillars in the extra-oral image to locations on the reference pillars in the 3D model. The matching locations enable an optional alignment of the 3D model based on the extra-oral image.

In some embodiments, in order to be visible in an oral scan or an extra-oral image, the reference pillar is made from a material which shows up in such scans. By way of a non-limiting example, when the scanner is an optical scanner, or a laser scanner, or a confocal scanner, the material is a material which shows up well in a scan image, such as a non-shiny material or a material having a color contrasting with a mouth.

In some embodiments, in order to be visible in an extra-oral image, the reference pillar is made long enough to protrude from a scan post, by way of some non-limiting examples, in a range between 3 millimeters to 15 millimeters, 20 millimeters, 30 millimeters and 50 millimeters long.

In some embodiments, in order to be visible in an extra-oral image, the reference pillar is made long enough to protrude from a patient mouth, by way of some non-limiting examples, in a range between 3 millimeters to 6 millimeters, 10 millimeters, 20 millimeters, 30 millimeters and 50 millimeters long.

In some embodiments the reference pillar is made in sections which may be broken off, so a dentist can adjust the length.

In some embodiments instances of the reference pillar are made in different lengths, so a dentist can choose the length.

In some embodiments the reference pillar is made flexible which may be bent, so a dentist can adjust angulation.

An aspect of some embodiments of the invention includes making a coronal end of the reference pillar ball shaped or spherical. Such a shape can aid accurate location in an image or scan, for example by finding edges of the sphere or a center of the sphere, and can aid automatic identification.

In some embodiments the sphere is made small, which may potentially increase accuracy in location. By way of a non-limiting example, the sphere can be made smaller than a diameter of an elongate portion of the reference pillar. In some embodiments a diameter of the sphere is optionally in a range of 1 millimeter to 2 millimeters, 3 millimeters, 4 millimeters and 5 millimeters.

In some embodiments the sphere is made relatively bigger, which may potentially increase ease of identification and/or location and/or automatic identification. Potentially, accuracy may not suffer, by using a location of a center of the sphere for alignment. By way of a non-limiting example, the sphere can be made larger than a diameter of an elongate portion of the reference pillar. In some embodiments a diameter of the sphere is optionally in a range of 3 millimeters to 4 millimeters, 5 millimeters, 7 millimeters and 10 millimeters.

In some embodiments, Dental Smile Design (DSD) software is optionally used for the alignment.

Reference is now made to FIG. 16, which is a clinical image of a patient who has scan posts and reference pillars attached thereto according to an example embodiment of the invention.

FIG. 16 shows a patient's mouth 1502, with reference pillars 1501 showing.

FIG. 15 also shows scan posts 1510, to which the reference pillars 1501 are attached.

In some embodiments a patient's mouth may include some scan posts which are not visible in an extra-oral image. By way of a non-limiting example, the extra-oral image of FIG. 16 may be of a patient with additional scan posts which are hidden within the patient's mouth. Some of the hidden scan posts may optionally have bite pillars attached thereto. For example, the patient's molars are not seen in FIG. 16, and may have scan posts and/or scan posts with bite pillars attached thereto, which are not visible in the extra-oral image of FIG. 16.

FIG. 16 also show some details of the reference pillars 1501:

an optional identifiable feature such as a spherical shape 1505 on a tip of the reference pillars 1501;

an optional stricture 1506, or narrow portion, of the reference pillars 1501, which optionally aids in defining a location of the identifiable feature;

an optional slotted or knurled portion 1504, optionally used for gripping the reference pillars 1501, optionally by screwing the reference pillars 1501 into or onto the scan post 1510; and an optional smooth portion 1503.

Reference is now made to FIGS. 17A, 17B and 17C, which are simplified line drawing illustrations of a reference pillar according to an example embodiment of the invention.

FIG. 17A is an isometric view, FIG. 17B is a side view, and FIG. 17C is a cross-sectional view of a cross section marked by reference line A 1607.

In the example embodiment of FIGS. 17A-C, a reference pillar 1601 includes a spherical portion 1605; a stricture 1606; a main portion 1604; and a narrow portion 1602 for inserting into a scan post (not shown).

In the example embodiment of FIGS. 17A-C, the reference pillar 1601 includes a main portion 1604 which is at least partially slotted or knurled.

FIG. 17C shows the main portion 1604 of the reference pillar 1601 is partly slotted or knurled 1609 and partly smooth 1608.

FIG. 17C also shows that the main portion 1604 of the reference pillar 1601 is larger or equal in diameter to the spherical portion 1605, since the spherical portion 1605 is not visible in the view provided by the cross-sectional view of FIG. 17C.

Reference is now made to FIGS. 18A and 18B, which are simplified line drawing illustrations of a reference pillar on a scan post according to an example embodiment of the invention.

FIGS. 18A and 18B show a reference pillar 1701 and a scan post 1711.

FIG. 18A is a side view, and FIG. 18B is a cross-sectional view.

In the example embodiment of FIGS. 18A and 18B, the reference pillar 1701 is screwed into the scan post 1711. In some embodiments of the invention the reference pillar 1701 optionally has a screw portion 1702, which screws into a threaded hole 1716 in the scan post 1711.

FIGS. 18A and 18B also show a conical portion 1714 of the scan post 1711; and an optional flat facet 1713 on the conical portion 1714.

FIG. 18B also shows an optional rivet or screw 1718 for connecting the scan post 1711 to a dental implant or abutment (not shown).

Reference is now made to FIGS. 19A, 19B and 19C, which are simplified line drawing illustrations of a reference pillar according to an example embodiment of the invention.

FIG. 19A is an isometric view, FIG. 19B is a side view, and FIG. 19C is a cross-sectional view of a cross section marked by reference line A 1907.

In the example embodiment of FIGS. 19A-C, the reference pillar 1901 includes a spherical portion 1905; a stricture 1906; a main portion 1904; and a threaded portion 1902 for screwing into a scan post (not shown).

In the example embodiment of FIGS. 19A-C, the reference pillar 1901 includes a main portion 1904 which is at least partially slotted or knurled.

FIG. 19C shows the main portion 1904 of the reference pillar 1901 is smaller in diameter than the spherical portion 1905, since the spherical portion 1905 is visible in the view provided by the cross-sectional view of FIG. 19C.

Reference is now made to FIGS. 20A and 20B, which are simplified line drawing illustrations of a reference pillar on a scan post according to an example embodiment of the invention.

FIGS. 20A and 20B show a reference pillar 1901 and a scan post 1911.

FIG. 20A is a side view, and FIG. 20B is a cross-sectional view.

In the example embodiment of FIGS. 20A and 20B, the reference pillar 1901 is screwed into the scan post 1911. In some embodiments the reference pillar 1901 optionally has a screw portion 1902, which screws into a threaded hole 1916 in the scan post 1911.

FIGS. 20A and 20B also show a conical portion 1914 of the scan post 1911; and an optional flat facet 1913 on the conical portion 1914.

FIG. 20B also shows an optional rivet or screw 1918 for connecting the scan post 1911 to a dental implant or abutment (not shown).

In some embodiments a reference pillar is optionally attached directly to a dental implant.

Reference is now made to FIGS. 21A and 21B, which are simplified line drawing illustrations of a reference pillar in a dental implant according to an example embodiment of the invention.

FIGS. 21A and 21B show a reference pillar 1921 and a dental implant 1931.

FIG. 21A is a side view, and FIG. 21B is a cross-sectional view.

In the example embodiment of FIGS. 21A and 21B, the reference pillar 1921 is attached to the dental implant 1931. In some embodiments the reference pillar 1921 optionally has a press-fit portion 1922, which fits into a hole 1934 in the dental implant 1931. In some embodiments (not shown) a reference pillar is optionally screwed into a threaded hole in a dental implant.

FIGS. 21A and 21B also show an optional spherical portion 1925 at a coronal end of the reference pillar 1921; and an optional stricture 1926 between the spherical portion 1925 and a rest of the reference pillar 1921.

FIG. 21A also shows an optional slotted or knurled portion 1924 of the reference pillar 1921 and an optional smooth portion 1932 of the reference pillar 1921.

In some embodiments a reference pillar is optionally attached directly to a dental abutment, which is optionally attached to a dental implant.

Reference is now made to FIGS. 22A and 22B, which are simplified line drawing illustrations of a reference pillar in an abutment according to an example embodiment of the invention.

FIGS. 22A and 22B show a reference pillar 2201, a dental abutment 2202 and a dental implant 2203.

FIG. 22A is a side view, and FIG. 22B is a cross-sectional view.

In the example embodiment of FIGS. 22A and 22B, the reference pillar 2201 is attached to the dental abutment 2202. In some embodiments the reference pillar 2201 optionally has a press-fit portion 2207, which fits into a hole in the dental abutment 2202. In some embodiments (not shown) a reference pillar is optionally screwed into a threaded hole in a dental abutment.

FIGS. 22A and 22B also show an optional spherical portion 2205 at a coronal end of the reference pillar 2201; and an optional stricture 2206 between the spherical portion 1925 and a rest of the reference pillar 2201.

FIG. 22A also shows an optional slotted or knurled portion 2207 of the reference pillar 2201 and an optional smooth portion 2203 of the scan post reference pillar.

Reference is now made to FIG. 23A, which is a simplified flow chart illustration of a method of mouth model registration using a reference pillar according to an example embodiment of the invention.

The method of FIG. 23A includes:

attaching a scan post to a dental implant in a patient's jaw (2102);

attaching a reference pillar to the scan post (2104); and recording an image of the patient's jaw with the reference pillar and the scan post attached thereto (2106).

In some embodiments, a 3D scan of the patient's jaw with the registration pillar and the scan post attached thereto is also recorded.

In some embodiments, a registration of the image and a 3D model based on the 3D scan is optionally performed, based on the reference pillar appearing in both the image and the 3D scan.

In some embodiments a dental restoration is optionally designed based on the aligned image and 3D model.

In some embodiments the dental restoration is optionally superimposed on the image of the patient's jaw.

In some embodiments the attaching the scan post to the dental implant and the attaching the reference pillar to the scan post includes attaching a reference pillar optionally already attached to the scan post to the dental implant.

In some embodiments an oral scan of both of the patient's jaws is optionally additionally performed with the registration post and corresponding scan post attached to the patient's jaw.

In some embodiments the attaching the registration post and corresponding scan post optionally includes attaching more than one registration post and corresponding scan post to more than one corresponding dental implants in a patient's jaw.

In some embodiments at least one of the registration posts and corresponding scan posts is attached to a different jaw then at least another of the registration posts and corresponding scan posts.

In some embodiments the image of the patient's jaw is used to align models of each one of both of the patient's jaws, the models being based, at least in part, on the oral scan.

Reference is now made to FIG. 23B, which is a simplified flow chart illustration of a method of producing a simulation of restored teeth using a reference pillar according to an example embodiment of the invention.

The method of FIG. 23B includes:

obtaining a 3D model of a patient jaw with reference pillars (2311);

obtaining a 2D image of the patient jaw with reference pillars (2312). In some embodiments the 2D image is obtained before the 3D model, In some embodiments the 3D model is obtained before the 2D image. In some embodiments a 3D image or scan is obtained in place of a 2D image;

marking locations of the reference pillars in the 3D model (2313);

marking locations of the reference pillars in the 2D image (2314). In some embodiments the 2D image is marked before the 3D model, In some embodiments the 3D model is marked before the 2D image;

aligning the 3D model with the 2D image (2315), based, at least in part, on the marking; and displaying a portion of a 3D model for teeth restoration layered onto the aligned 3D jaw model, to produce a simulation of restored teeth in the 2D image (2316).

In some embodiments the 3D model for teeth restoration includes images of teeth, which are located at their correct location in the 3D jaw model, and the 2D image is optionally displayed with the teeth, optionally showing an image of teeth restored to the patient.

It is expected that during the life of a patent maturing from this application many relevant dental implants will be developed and the scope of the term "dental implant" is intended to include all such new technologies a priori.

It is expected that during the life of a patent maturing from this application many relevant abutments will be developed and the scope of the term "abutment" is intended to include all such new technologies a priori.

As used herein the term "about" refers to ±20%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the dental and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for generating a digital three-dimensional model of a patient's jaw which includes a top jaw and a bottom jaw, wherein a dental implant is provided in the patient's jaw, the method comprising:
    attaching a scan post to the dental implant;
    performing a first three-dimensional oral scan of the top jaw to obtain a first digital three-dimensional model of the top jaw;
    performing a second three-dimensional oral scan of the bottom jaw to obtain a second digital three-dimensional model of the bottom jaw;
    attaching a bite pillar to the scan post;
    adjusting a distance of a coronal end of the bite pillar to the apical end of the scan post to a desired bite distance;
    performing a third three-dimensional oral scan of the patient's jaw with the bite pillar and the scan post attached to the patient's jaw at the desired bite distance to obtain a third digital three-dimensional model;
    aligning the first digital three-dimensional model of the top jaw based on the third digital three-dimensional model and aligning the second digital three-dimensional model of the bottom jaw based on the third digital three-dimensional model, thereby obtaining said digital three-dimensional model of the patient's jaw.

2. The method of claim 1, wherein the attaching the scan post to the dental implant and the attaching the bite pillar to the scan post comprises attaching the bite pillar already attached to the scan post to the dental implant.

3. The method of claim 1, wherein the adjusting comprises adjusting the bite pillar to achieve correct bite closure when the top jaw is closed against the bottom jaw.

4. The method of claim 1, wherein the adjusting comprises iteratively adjusting the bite pillar to achieve correct bite closure.

5. The method of claim 1, wherein the adjusting comprises iteratively adjusting the bite pillar until it is stopped by an object selected from a group consisting of:
    a natural tooth;
    an antagonist bite pillar;
    an object fixed in the patient's mouth.

6. The method of claim 1, further comprising locking adjustment of the distance of the bite pillar to the scan post.

7. The method of claim 1, wherein:
    the attaching the bite pillar and the scan post comprises attaching a plurality of bite pillars and corresponding scan posts to a plurality of dental implants in the patient's jaw; and
    the adjusting a distance of a coronal end of the bite pillar to the apical end of the scan post to a desired distance comprises adjusting distances of coronal ends of the bite pillars to apical ends of a respective scan post.

8. The method of claim 1, wherein said second digital three-dimensional oral scan is performed with the patient's jaw closed.

9. The method of claim 1, wherein said top jaw comprises no teeth.

10. The method of claim 1, wherein said bottom jaw comprises no teeth.

* * * * *